(12) United States Patent
Kirby et al.

(10) Patent No.: US 11,199,403 B2
(45) Date of Patent: Dec. 14, 2021

(54) SPIRIT LEVEL

(71) Applicant: STABILA MESSGERÄTE GUSTAV ULLRICH GMBH, Annweiler (DE)

(72) Inventors: Wyatt Ray Kirby, Minesing (CA); Jan Neukumeter, Waldrohrbach (DE); Sebastian Scheib, Annweiler am Trifels (DE); Gabriel Kallabis, Spirkelbach (DE)

(73) Assignee: STABILA MESSGERÄTE GUSTAV ULLRICH GMBH, Annweiler (DE)

( * ) Notice: Subject to any disclaimer, the term of this patent is extended or adjusted under 35 U.S.C. 154(b) by 20 days.

(21) Appl. No.: 16/890,212

(22) Filed: Jun. 2, 2020

(65) Prior Publication Data
US 2021/0310805 A1 Oct. 7, 2021

(30) Foreign Application Priority Data

Apr. 6, 2020 (DE) .................... 10 2020 109 498.1

(51) Int. Cl.
*G01C 9/34* (2006.01)
*G01C 9/26* (2006.01)

(52) U.S. Cl.
CPC ............... *G01C 9/34* (2013.01); *G01C 9/26* (2013.01)

(58) Field of Classification Search
CPC .................................. G01C 9/24; G01C 9/34
USPC .......................................... 33/381, 382, 383
See application file for complete search history.

(56) References Cited

U.S. PATENT DOCUMENTS

| | | | |
|---|---|---|---|
| 1,074,367 A | 9/1913 | Keefauver | |
| 3,328,887 A | 7/1967 | Wright | |
| 3,861,052 A | 1/1975 | Siegfried | |
| 4,435,908 A | 3/1984 | Semler, Jr. | |
| 4,733,475 A | 3/1988 | Youmans | |
| 4,932,132 A | 6/1990 | Baker et al. | |
| 4,934,706 A * | 6/1990 | Marshall | A63B 69/3632 33/334 |
| 5,433,011 A * | 7/1995 | Scarborough | G01C 9/28 33/374 |
| 5,933,973 A * | 8/1999 | Fenley, Jr. | A47G 1/205 33/451 |
| 6,279,240 B1 * | 8/2001 | Bonaventura, Jr. | G01C 9/26 33/374 |

(Continued)

FOREIGN PATENT DOCUMENTS

| | | |
|---|---|---|
| CN | 201259421 Y | 6/2009 |
| DE | 3218716 A1 | 11/1983 |

OTHER PUBLICATIONS

German Office Action, dated Mar. 9, 2021, corresponding to German Application No. 10 2020 109 498.1.

*Primary Examiner* — George B Bennett
(74) *Attorney, Agent, or Firm* — Ladas & Parry LLP; Malcolm J. MacDonald

(57) ABSTRACT

Spirit level (10) for checking the alignment of an object (12), having a first elongated body (22) and a second body (26) movable therealong and connected thereto, and a fixing device (502, 614) by means of which the first and the second body are fixable relative to one another, the first and the second body each having at least one section (24, 28; 25, 29) of at least one measuring plate of the spirit level. The spirit level has a clamping element of a clamping device (18, 20) subjected to force in the longitudinal direction of the spirit level for fixing the spirit level between object areas (14, 16).

43 Claims, 16 Drawing Sheets

(56) References Cited

U.S. PATENT DOCUMENTS

Figure 1:
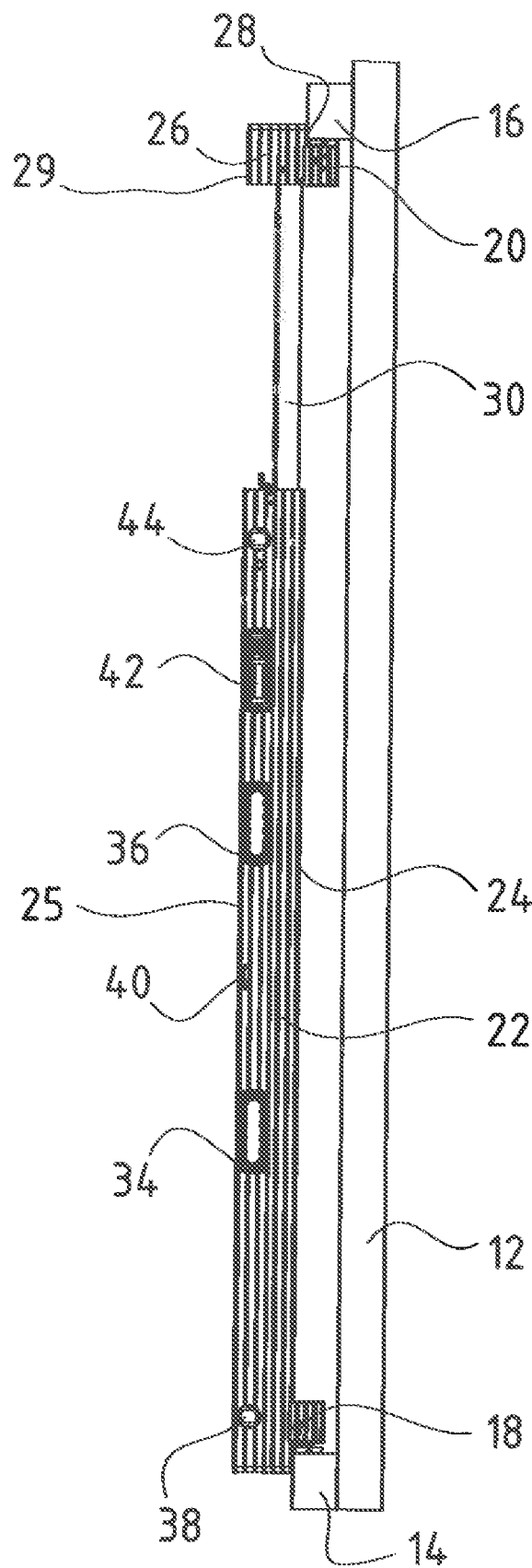

| | | | | |
|---|---|---|---|---|
| 6,550,156 B1 * | 4/2003 | Scoville | ............... | F16L 55/18 |
| | | | | 33/371 |
| 6,658,752 B1 * | 12/2003 | Bonaventura, Jr. | ...... | G01C 9/26 |
| | | | | 33/374 |
| 6,915,585 B2 * | 7/2005 | Von Wedemeyer | ..... | G01C 9/28 |
| 7,497,022 B1 | 3/2009 | Aarhus | | |
| 7,797,848 B2 * | 9/2010 | Cobb | ............... | G01C 9/26 |
| | | | | 33/374 |
| 7,971,367 B2 * | 7/2011 | Stengel | ............... | G01B 3/08 |
| | | | | 33/809 |
| 7,979,998 B2 * | 7/2011 | Ziegmann | ............ | A47B 88/423 |
| | | | | 33/645 |
| 8,061,051 B2 * | 11/2011 | Allemand | ............... | G01C 9/34 |
| | | | | 33/371 |
| 8,402,667 B2 | 3/2013 | Spaulding | | |
| 9,021,710 B2 * | 5/2015 | Silberberg | ............... | G01C 9/28 |
| | | | | 33/371 |
| 10,935,380 B2 * | 3/2021 | Cochran | ............... | G01C 9/28 |
| 2004/0134082 A1 | 7/2004 | Von Wedemeyer | | |

\* cited by examiner

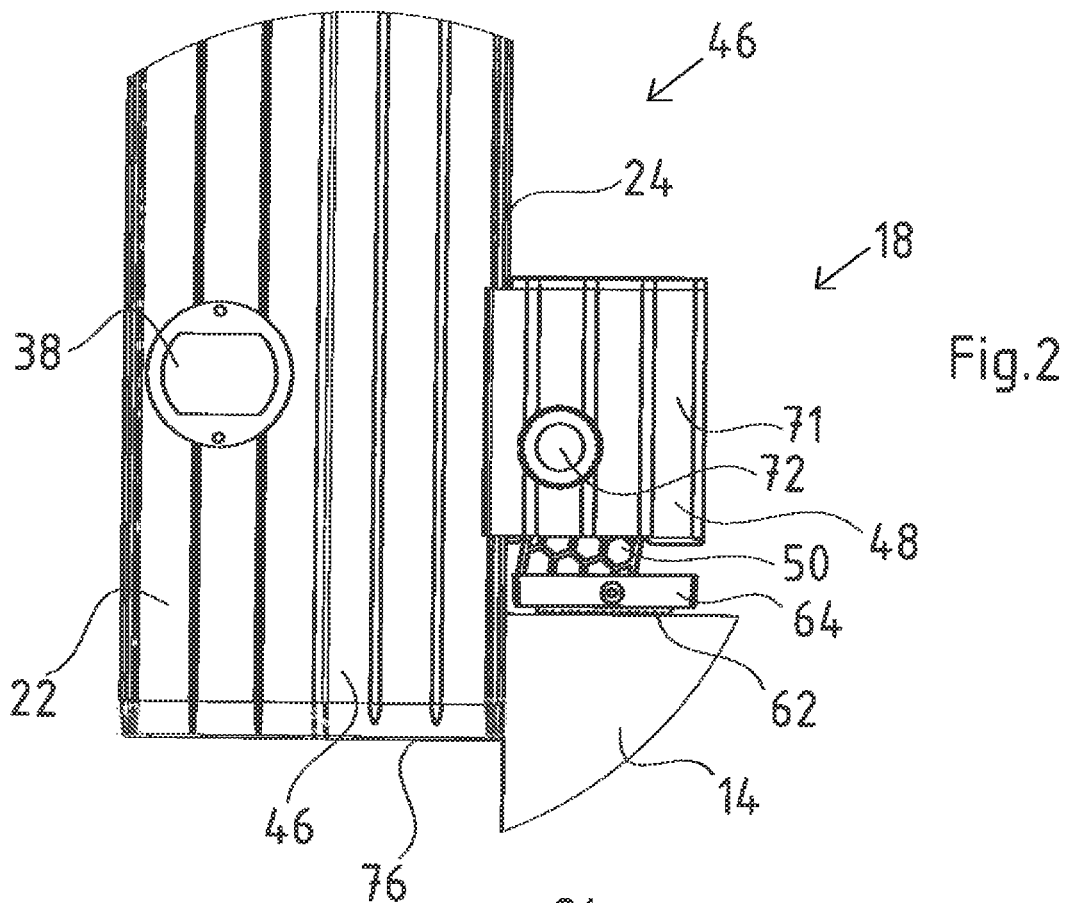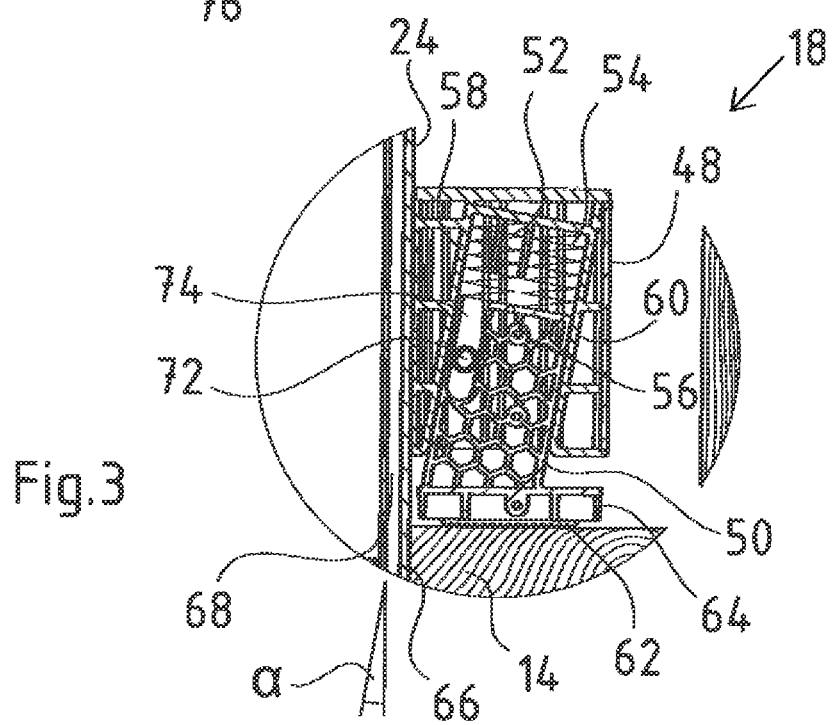

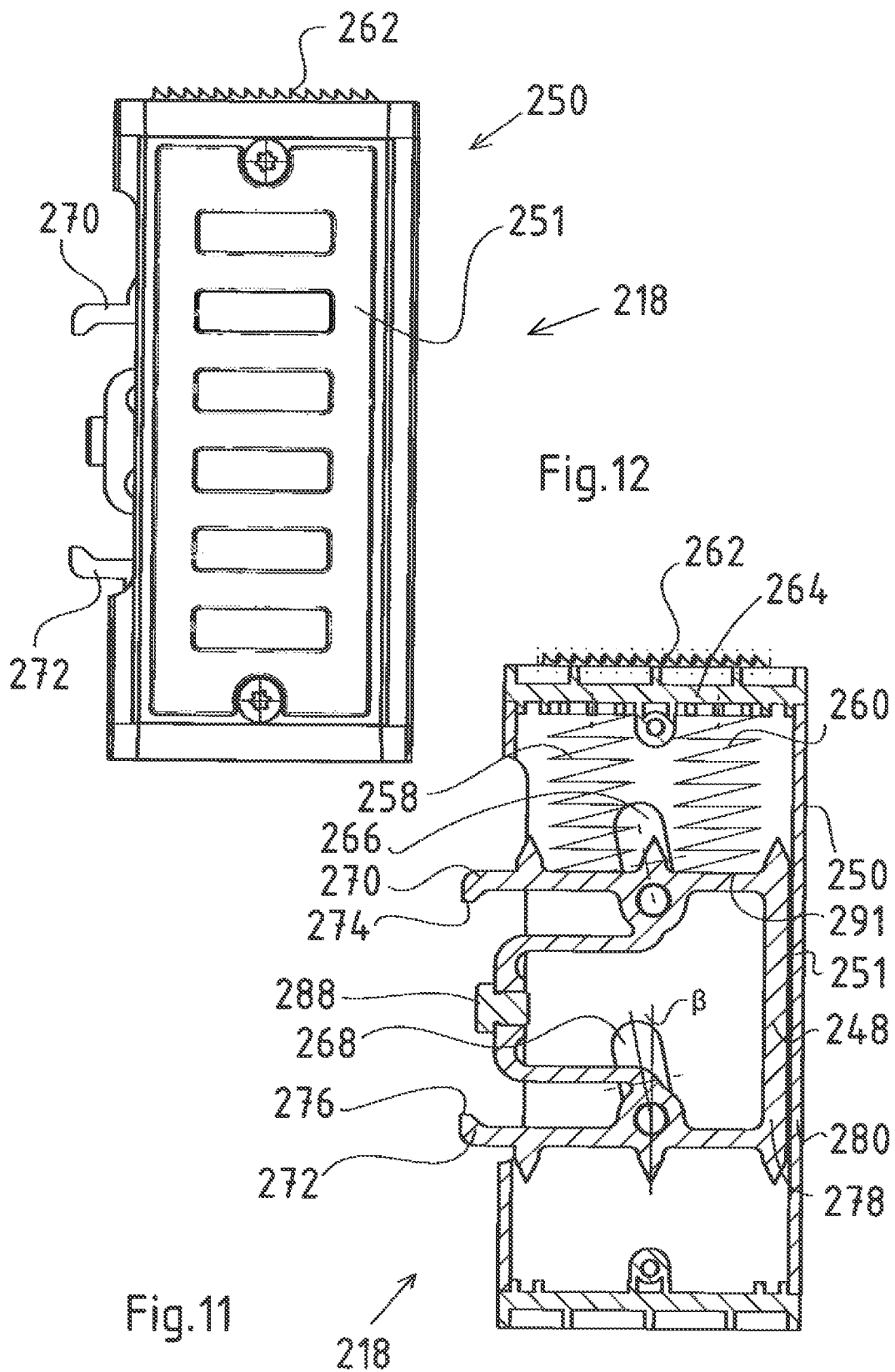

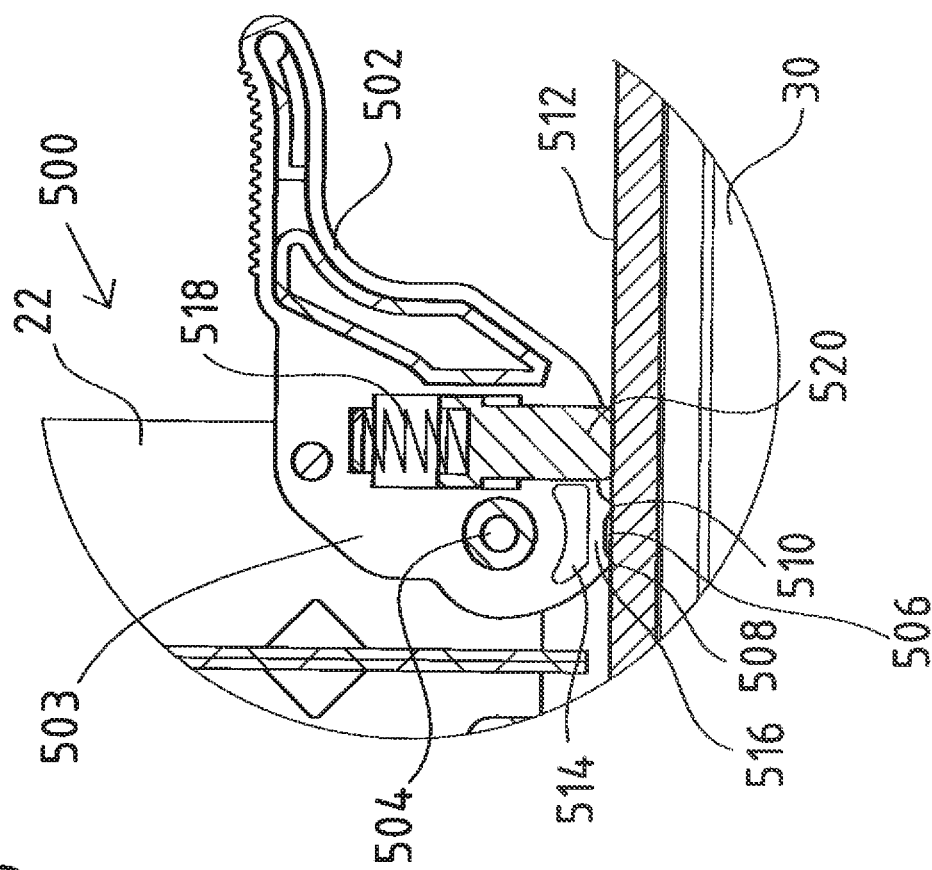
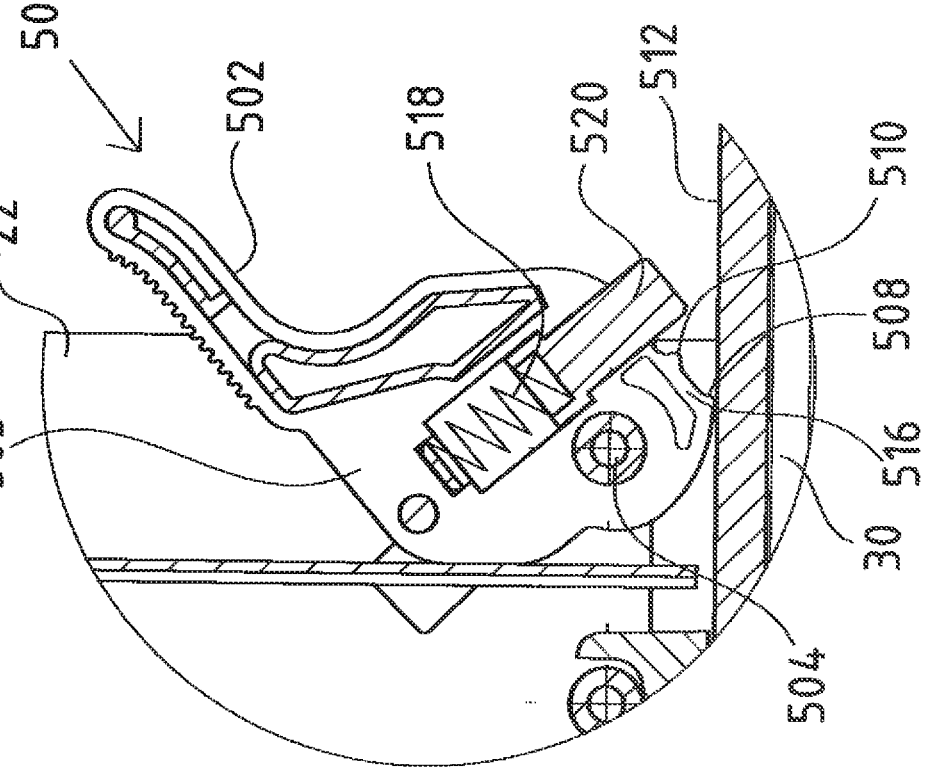

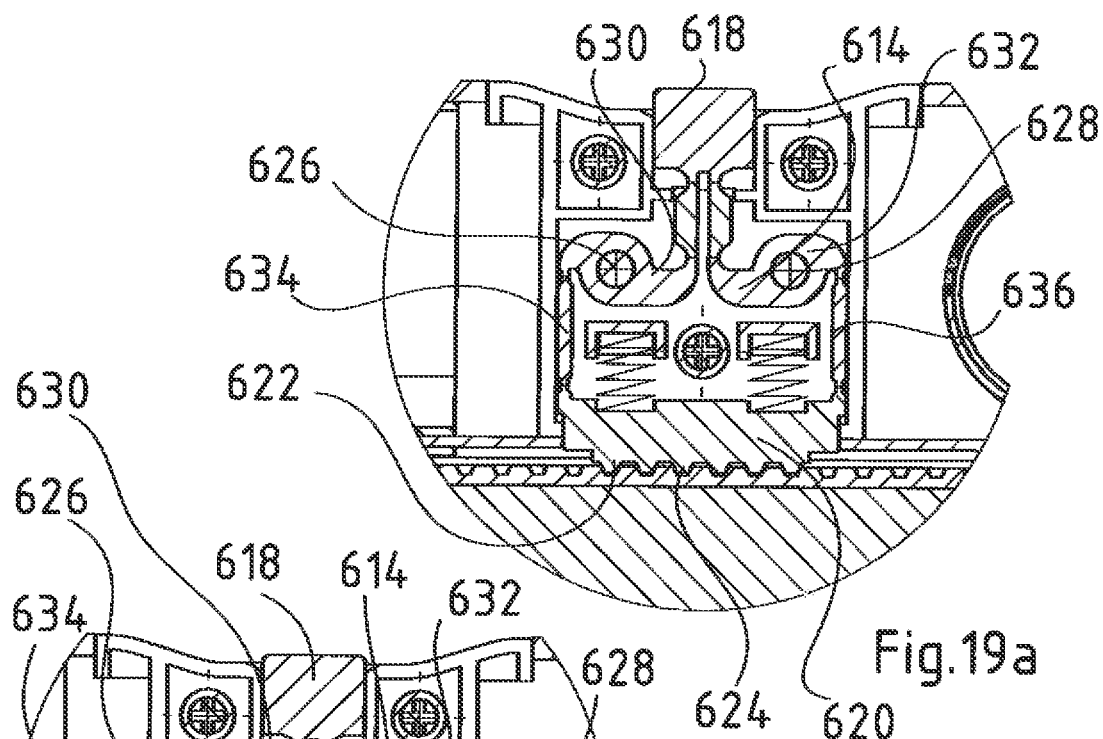
Fig.19a
Fig.19b
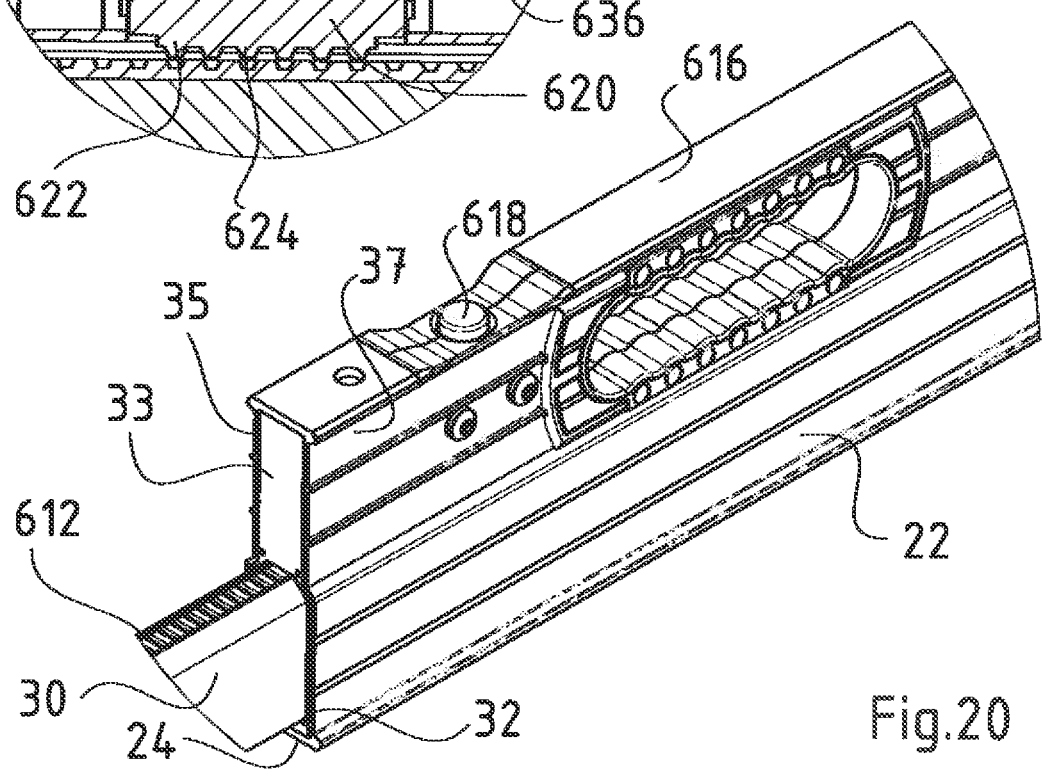
Fig.20

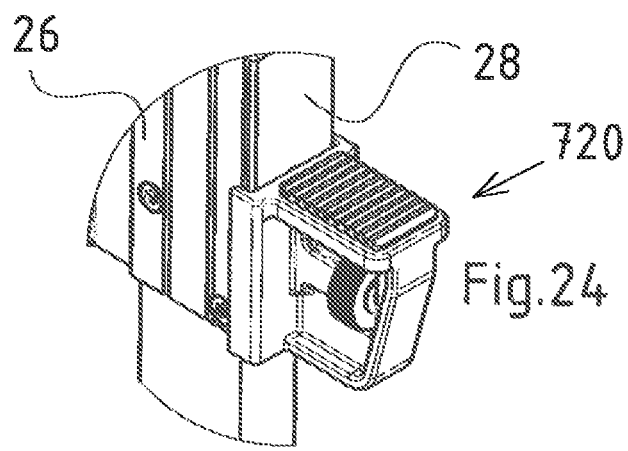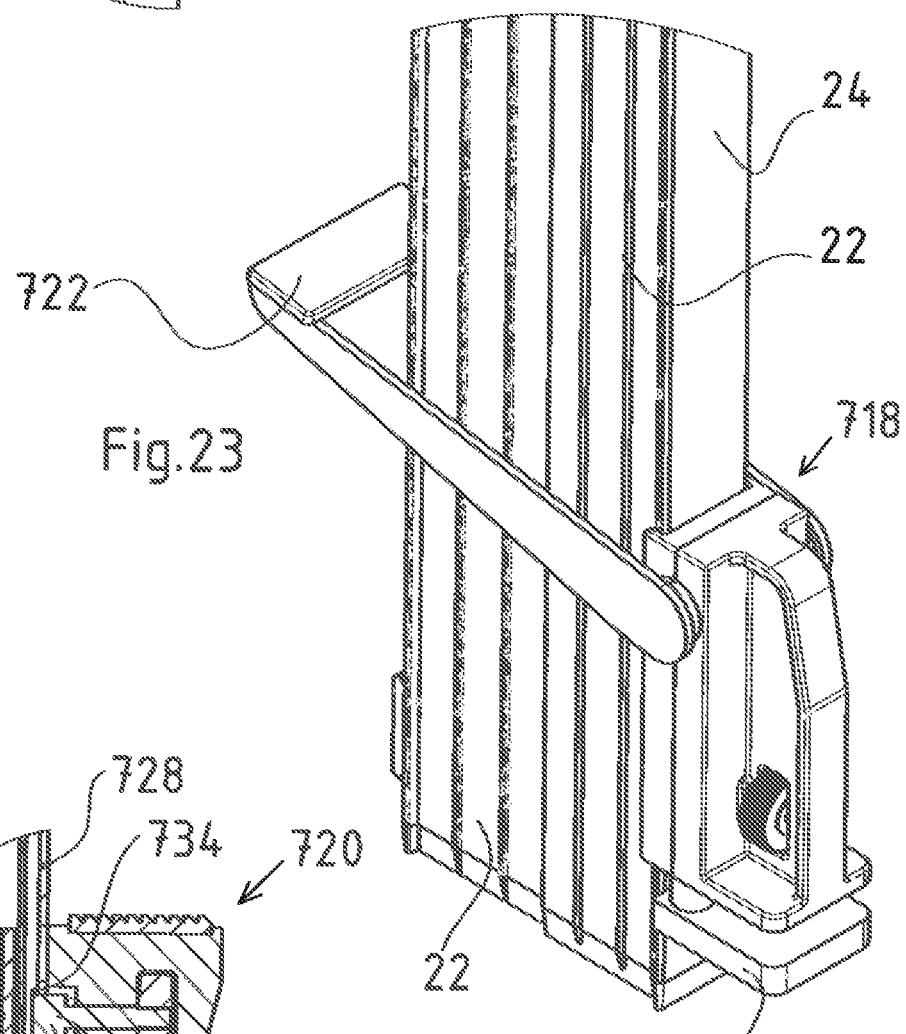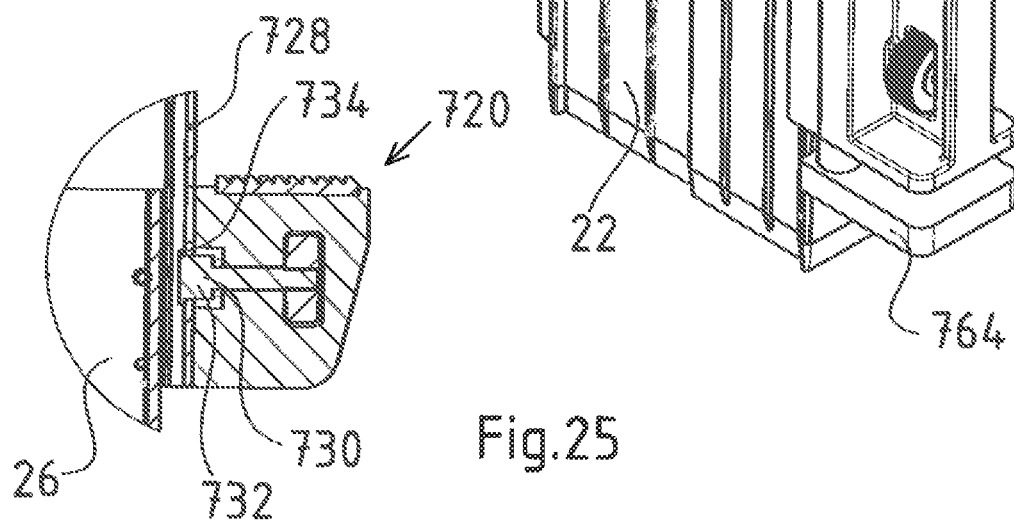

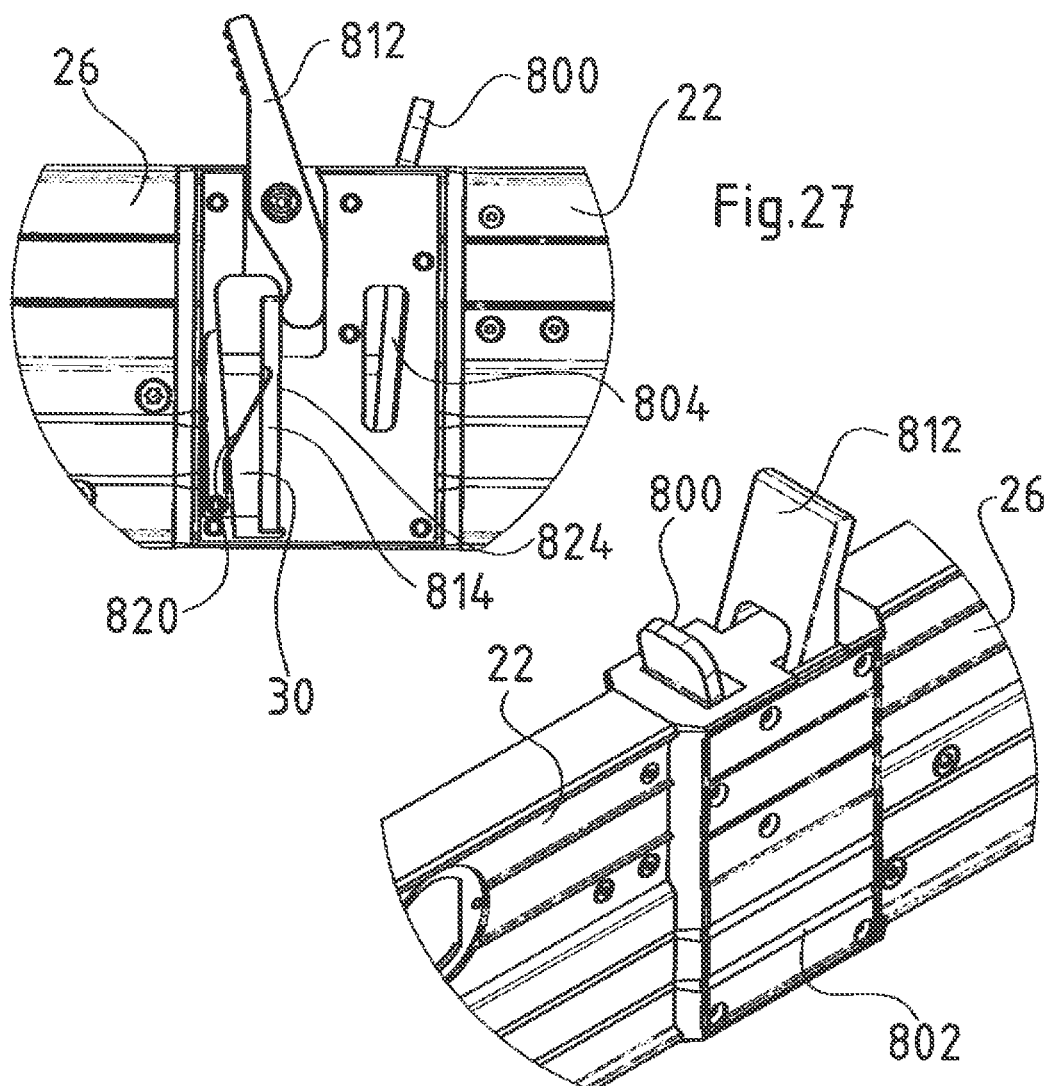

SPIRIT LEVEL

This application claims priority to German Patent Application No. 10 2020 109 498.1, filed Apr. 6, 2020, the contents of which are incorporated by reference herein.

The invention relates to a spirit level for checking the alignment of an object, comprising a first elongated body and a second elongated body movable therealong and connected thereto, and to a fixing device by means of which the first and the second body are fixable relative to one another, said first and the second body each having at least one section of at least one measuring plate of the spirit level.

In hollow profile spirit levels, the outer surfaces of the hollow profiles below and above the vials usually act as the measuring plates or measuring surfaces. In this case, the first and the second bodies each have sections of the measuring plate and measuring surface, which can also be referenced identically.

A spirit level of this type is described in WO 02/101330 A1. The bodies each having one section of the measuring plates are length-adjustably connected by a profile element originating from one of the bodies, the profile element being length-movably arranged in a hollow profile of the other body. Spirit levels of this type, which are also referred to as telescopic spirit levels, can be extended up to lengths of more than three meters. Regardless of this, it is assured that the measuring plate sections extending at a large distance apart from one another are aligned flush with one another.

Using these telescoping spirit levels, stud walls or frame walls, for example, can be vertically aligned.

With large distances between the contact points, it is frequently difficulty to maintain contact with them, which is essential if a correct alignment is to be ensured.

To determine whether the surfaces of curb stones limiting a path are at the same level, a spirit level according to U.S. Pat. No. 1,074,367 A can be used that has a spirit level body out of whose front faces strip-like extension elements can be pulled, said elements having on the underside a contact section which is placed onto the surfaces to be measured. The spirit level body itself is at a distance to this surface in terms of height, so that the spirit level body itself is not suitable for measuring the inclination of a surface.

U.S. Pat. No. 8,402,667 B2 describes a spirit level from whose body originate swivelable clamping elements for clamping the spirit level tightly on a workpiece.

The object underlying the present invention is to improve a spirit level of the type mentioned at the outset such that even with a large distance between the contact points, it is ensured that contact with them is maintained during measurement.

Where necessary, there should also be the possibility for the object to be moved after alignment and placing of the spirit level on an object to be aligned, without a user having to hold the spirit level.

To solve the problem, the invention substantially provides that the spirit level has a clamping element of a clamping device subjected to force in the longitudinal direction of the spirit level and/or a transport element forcing the first and second body apart by frictional locking and also fixing them relative to one another in order to fix the spirit level between object areas.

It is in particular provided here that the clamping device projects above the measuring plate of the spirit level, and in particular originates from the measuring plate or from the area adjacent thereto of the first and/or second body.

In the following, the measuring plate is also to be understood as a synonym for measuring surface, without this having to be emphasized. Features relating to the measuring plate accordingly also apply in respect of the measuring surface.

In accordance with the invention, a telescoping spirit level is proposed that has a clamping device producing a clamping effect, such that fixing of the spirit level is possible and hence handling thereof is enabled without a user having to hold the spirit level. The spirit level can therefore be used for example to set up and align in particular a stud or frame wall, which has for example beams such as sole or bottom plates and top plates or purlins in the bottom and top areas on which the measuring plate sections are to be laid. By means of the clamping device subjected to force, there is the possibility of fixing the spirit level between the top plates or the purlins, allowing the object such as the stud or frame wall to be set up and aligned without it being necessary for the spirit level to be held. In technical terms, the beam in the bottom area of the frame wall is referred to as the sole or bottom plate and the beam in the top area as the top plate or purlin.

To ensure a secure contact between the measuring plate sections and the measuring points/contact points, the invention provides in accordance with an independently inventive proposal that the clamping device has a contact surface transverse to the longitudinal direction of the spirit level for making contact with an object area.

Due to the oblique contact surface, there is effectively a pulling of the spirit level in the direction of the object.

In a further development, it is provided that the contact surface is in a first end area of the measuring plate, that the plane or envelope formed by the contact surface intersects the measuring plate at an acute angle, and that the contact surface is at a distance from the first end area.

In particular, it is provided that the clamping device comprises a base element connected to one of the bodies and the clamping element having the contact surface and movable in the longitudinal direction of the spirit level by at least one spring element in the direction of the first end area.

An independently inventive proposal provides that the clamping element is subjected to force along a straight line which intersects the measuring plate at an acute angle $\alpha$ when the clamping device is connected to the spirit level and the clamping surface is preferably vertical to the straight line.

In particular, the angle $\alpha$ should be $5° \leq \alpha \leq 15°$.

Furthermore, it must be emphasized, and it is independently inventive, that the first body is movable relative to the second body and engaged in position.

If the clamping surface preferably has a course which is straight in section or is limited by a corresponding straight line which in turn is inclined relative to the measuring plate in order to permit the required pulling of the spirit level in the direction of the object to be checked, then an alternative provides that the clamping surface has a convex course with a section on the measuring plate side, that forms an acute angle $\beta$ with the measuring plate or with a straight line parallel thereto.

The clamping surface can have in the section which runs vertical to the measuring plate and in its longitudinal direction a wave-like or sawtooth-like structure, preferably with peaks facing in the direction of the measuring plate.

The invention is preferably characterized in that the first body has a first profile element in the longitudinal direction of the body and in the form of a first hollow profile, that the second body has a second profile element, in particular a second hollow profile, movably arranged inside the first hollow profile, that the fixing device is an eccentric lever originating from the first body with an engaging element such as a bolt element subjected to force in the direction of the second profile element for engagement in the engaging recess provided in the second profile element.

The eccentric lever can be designed such that in a first position movability of the second profile element inside the first profile element is enabled, and that in a second position the engaging element is aligned vertically or almost vertically to the longitudinal axis of the second profile element.

In a further development, it is provided that the eccentric lever has a limiting surface having at least one projection, which is the outer surface of an elastically yielding web-like section of the eccentric lever which in the second position of the eccentric lever is supported on the outer surface, facing away from the measuring plate, of the second profile element with the at least one projection, in order to inhibit movement of the second profile element.

An independently inventive proposal provides that the first body is in some sections steplessly movable relative to the second body and is engageable in at least one position in which the first body is moved longitudinally relative to the second body.

The first body can also be movable and then engaged in position over the entire extension length relative to the second body. This too is independently inventive.

For engagement, there is the possibility that at least one recess is provided in the one body and that the other body has an element preloaded in the direction of the recess and engaging in said recess when it is aligned flush therewith.

An independently inventive proposal is that the second body is length-adjustable relative to the first body by frictional locking from a spring-loaded lever element mounted in the first body and referred to as transport means, said lever element being swivelable preferably by means of a lever referred to as a transport lever and originating from the first body.

It is therefore provided in an independently inventive proposal that the transport element is movable, such as swivelable, by means of the transport lever in the pull-out direction of the spirit level, where during movement of the transport element it interacts in frictional locking with the profile element originating from the second body and guided inside the first body.

In a further development, the invention proposes that the transport element has members along the side wall of the profile element, consisting of a first cross member along the bottom of the profile element and a second cross member supported on the upper face of the profile element depending on the position of the transport lever. The first cross member is fixed in position, e.g. in a recess on the inside in the bottom wall of the first body.

It is provided in particular that the transport element can be subjected to force by a spring element in the direction of a stop, said transport element being at a distance from the upper face of the profile element when in contact with the stop. An unhindered movement of the second body relative to the first body is thus assured.

Transport levers and transport means, by which an increase in the length of the spirit level is enabled by frictional locking, also offer the advantages of the teachings in accordance with the invention that the spirit level is clampable between two object areas. However, it is not essential that the clamping devices used have clamping elements subjected to force. Instead, clamping elements designed as fixed stops can be used. It would even be possible that no clamping elements are used, and instead that the spirit level is clamped between the object areas by positioning the front areas of the spirit level bodies between the latter.

The invention is also characterized in that an unlocking lever originates from the first body, which in its basic position permits an increase of the distance between the bodies and prevents or inhibits a decrease in the distance.

As already mentioned, it can be provided in accordance with the invention that the clamping device has a base element connected to one of the bodies and a clamping element having the contact surface and movable in the longitudinal direction of the spirit level by at least one spring element in the direction of the first end area.

There is the possibility here that the base element extends along the measuring plate and is connected to one of the bodies by passing through, engaging in or enclosing said measuring plate.

It is thus possible to achieve in simple manner a fastening of the base element or a movement thereof along the measuring plate in order to fix it in the required position and hence fix it to object areas with appropriate distances between the bodies having the measuring plate sections.

To fix the clamping device in a simple manner, it can be provided that the base element has or is a housing surrounding the clamping element at least in some sections, in particular at least on the circumferential side.

Regardless of this, the measuring plate section of the first and/or second body should be limited by side wall sections of the first and/or second body or be adjacent to them. Further, groove-like depressions and/or strip-like projections should be provided in the side wall sections parallel to the measuring plate section.

These depressions and/or projections can interact with sections of the base element of the clamping device, and for fixing of said clamping device, sections of the base element can be in clamping contact with the side wall sections. This permits problem-free movement of the clamping device along the measuring plate section, and fixing too.

According to an alternative proposal, the invention provides that the base element of the clamping device has a receptacle for the end area of the first or second body on the measuring plate side.

This receptacle should have a recess extending along the end area on the measuring plate side and whose limit is set back from the measuring plate.

The measuring plate is thus exposed, with the consequence that it can be brought into contact with an object area to the required extent and the spirit level can be fixed using the clamping devices.

In a further development, it is provided that a section designed integral with the base element projects as the clamping element from said base element and has in particular in a first section parallel to the recess a U-shaped geometry and in the side view preferably a trapezoidal or oblique-angled V-shaped geometry, with the member facing the recess being or having the clamping surface.

Alternatively, an open and polygonal-column, in particular a triangular-column and resilient flat element, such as a sheet metal element, can originate from the base element, with a first outer member being connected to the base element and merging into a central member which in turn merges into a further outer member having the clamping surface.

For fastening the clamping device on the measuring plate or measuring plate section, there is also the possibility that a fixing element projects from the base element and is associated with a receptacle passing through the measuring plate section of the first and/or the second body where the fixing element is insertable in a first position into the receptacle and the base element is fixed after rotation of the fixing element and alignment of the base element along the measuring plate in the receptacle.

Furthermore, the invention is characterized in that the spirit level contains a sensor which generates a signal when the spirit level is for example vertically aligned. Such sufficiently well-known sensors can also be set such that the signal is made at other target angles, i.e. angles diverging from 90° to the horizontal, in order to set up the objects and position them at an angle. The target angle can for example be 45° or 75°, relative to the horizontal. If the target angle is 90°, the spirit level is vertically aligned.

It can thus be ascertained without referring to a vial when the object is perpendicular relative to the object areas on or with which sections of the measuring plate are in contact.

According to an independent proposal for a solution, the invention is characterized by a method for setting up of an object, such as a wall, in particular a wooden stud wall with, in particular in the bottom and top areas and preferably parallel to the edge of the object on the bottom or top side, object areas such as sole or bottom plates or top plates or purlins, where the alignment, in particular the vertical alignment, of the object is checked by means of a spirit level having a first elongated body and a second body connected thereto and movable therealong, in particular of a spirit level according to at least claim 1, where in one end area of the spirit level a clamping element subjected to force and acting in the longitudinal axis direction of the spirit level and in the other end area a further clamping element subjected to force and acting in the longitudinal axis direction of the spirit level or a supporting element are provided, comprising the method steps clamping of the spirit level between the object areas when the object is aligned outside the vertical, setting up of the object, a signal being generated by a sensor integrated in the spirit level upon a required target angle being reached, and fixing of the object in its target angle position.

Based on the teachings in accordance with the invention, there is the possibility to align even large objects precisely to the vertical or to other target angles, where positioning of the spirit level relative to object areas to be checked is possible in a position comfortable for the user, e.g. when the object is lying down. During setting up of the object, holding of the spirit level to contact the object is not required, so only the object itself has to be handled or this has to be done by means of the spirit level. After the required position, such as the vertical position, has been reached, a signal, either acoustic or visual, is generated, so that fixing of the object can then take place.

It is in particular provided that first the bodies of the spirit level are fixed relative to one another by engagement depending on the known distance between the object areas with which the spirit level should be in contact, in order to then fix the spirit level by moving the clamping elements and by subjecting at least one of the clamping elements to a force. It is provided that the clamping element subjected to a force is at a distance to its associated end area such that the measuring plate of the spirit level contacts the object area between the clamping element and the end area of the spirit level on the clamping element side.

In particular, the further clamping element subjected to a force or the supporting element should be at a distance to the associated end area, such that the measuring plate of the spirit level contacts the object area between the further clamping element or supporting element and the end area.

Further details, advantages and features of the invention can be gathered not only from the claims and in the features to be found therein, singly and/or in combination, but also from the description of preferred exemplary embodiments to be found in the description of the drawing.

Figure 4:
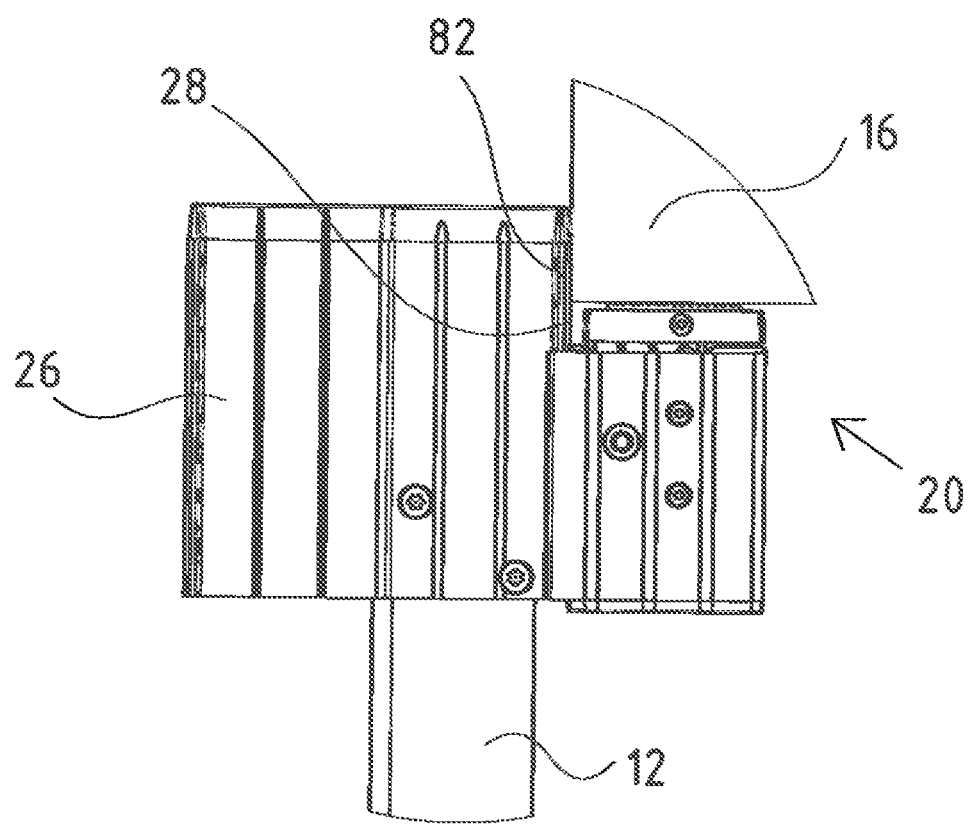
Figure 5:
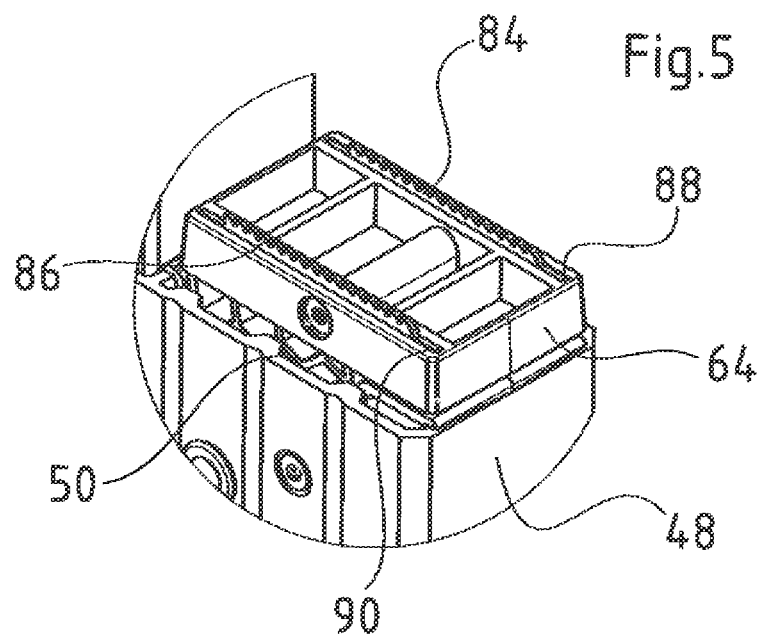
Figure 6:
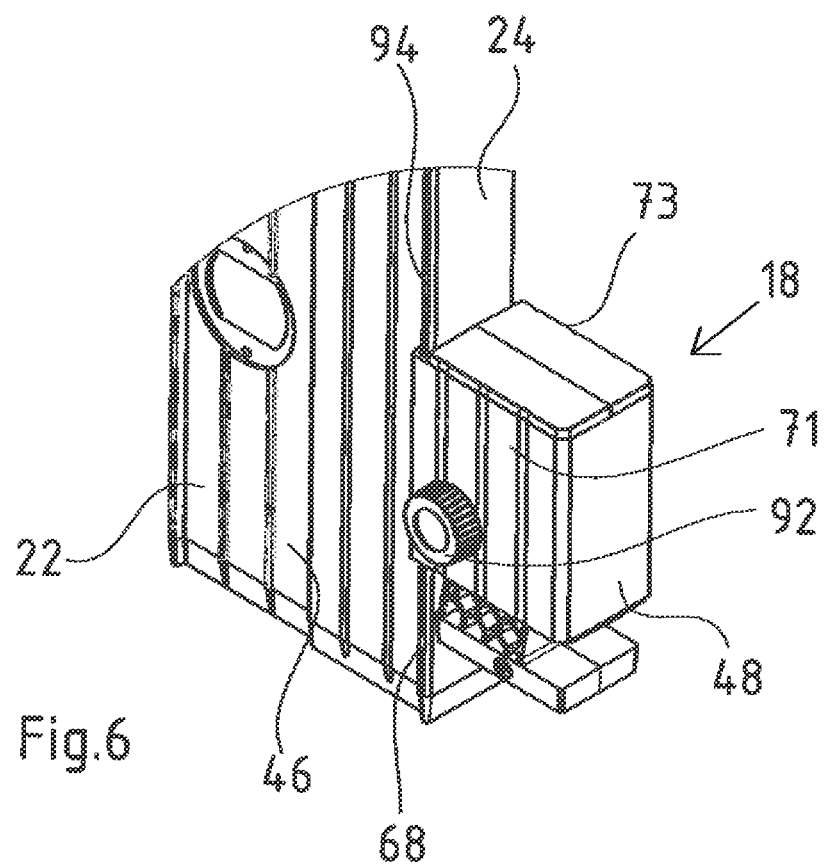
Figure 7:
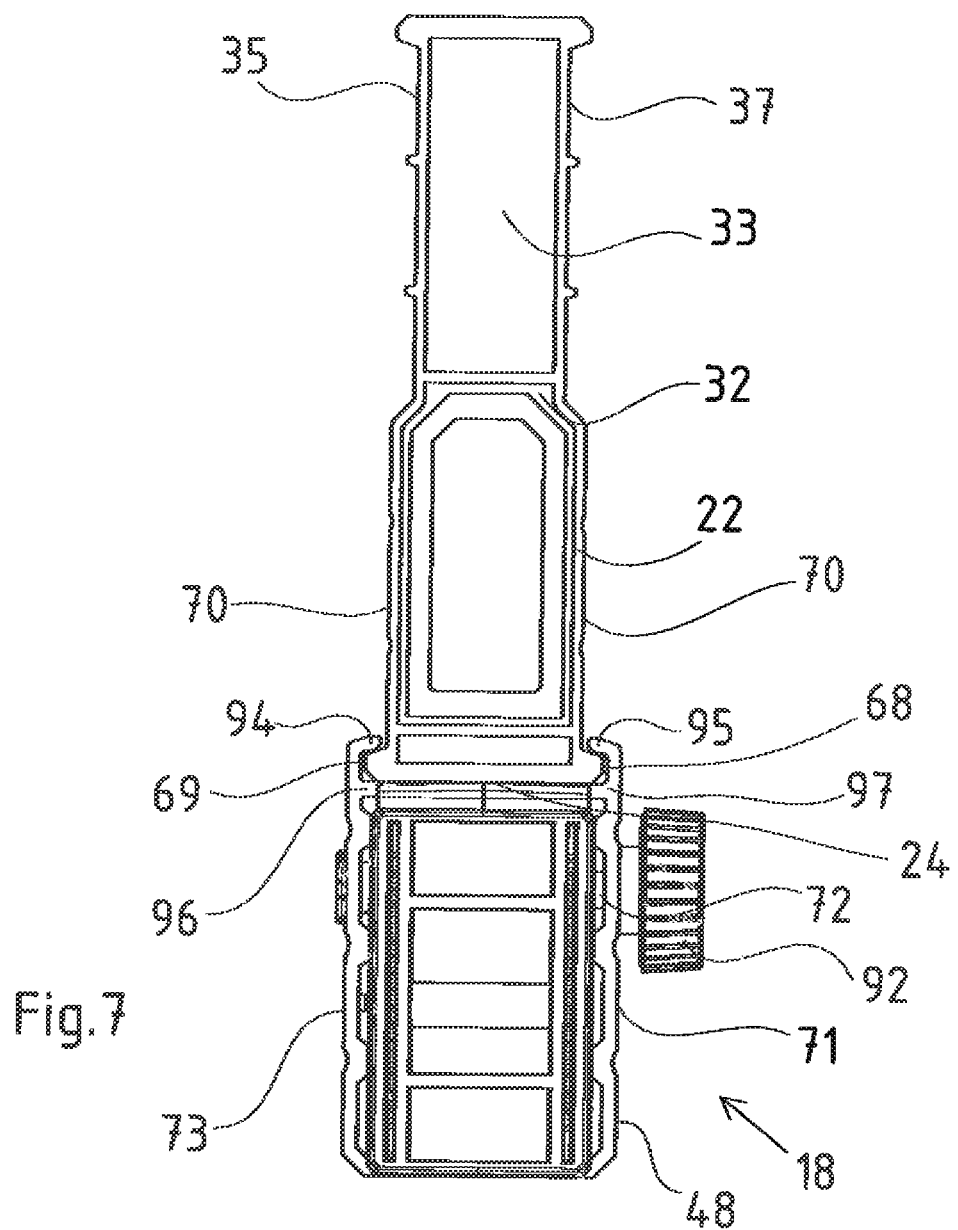
Figure 8:
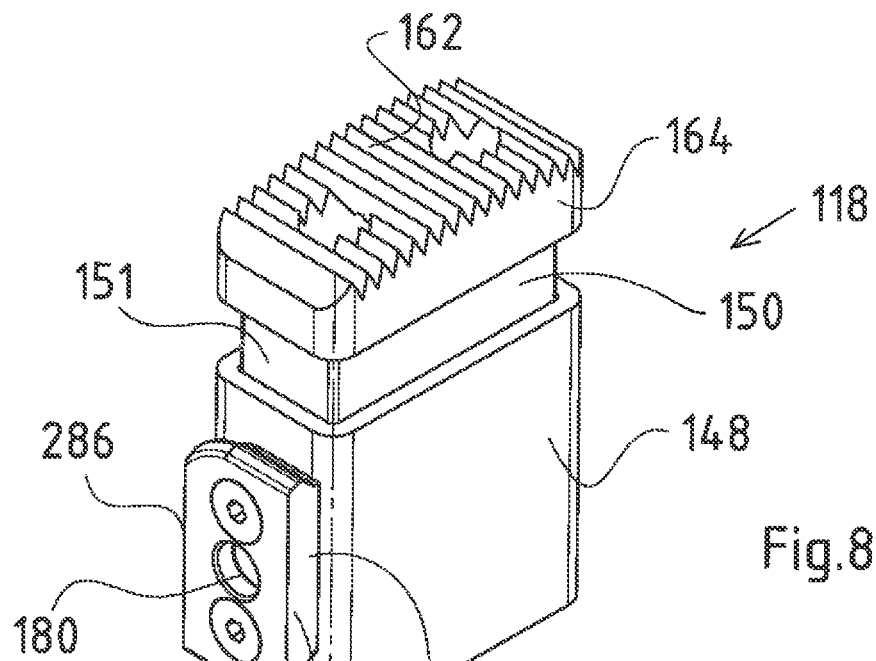
Figure 9:
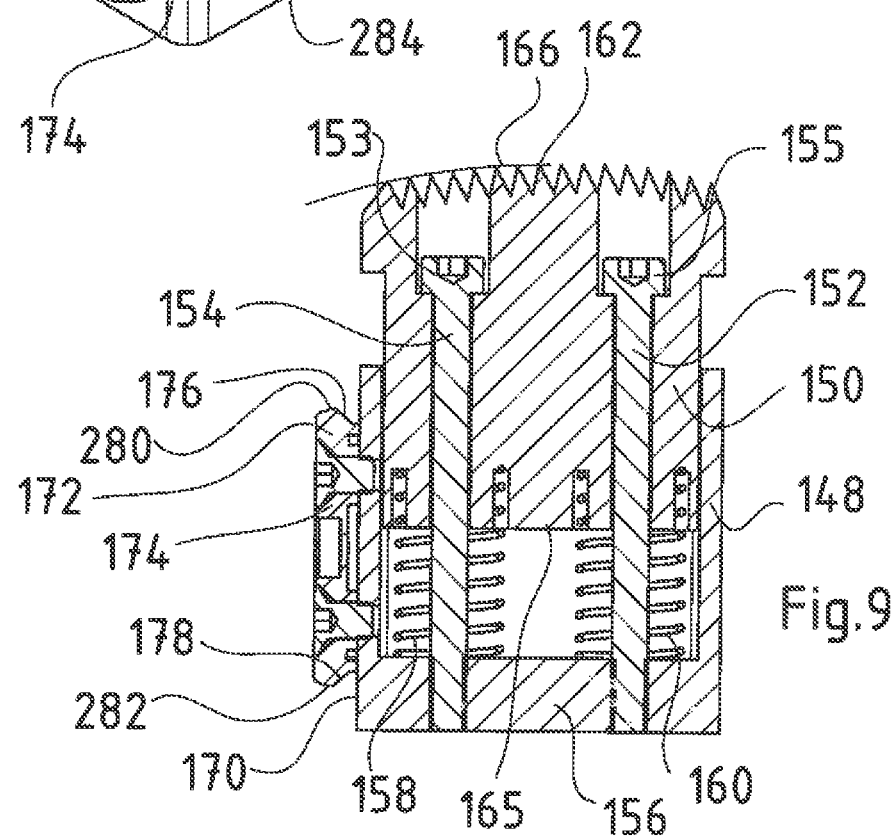
Figure 10:
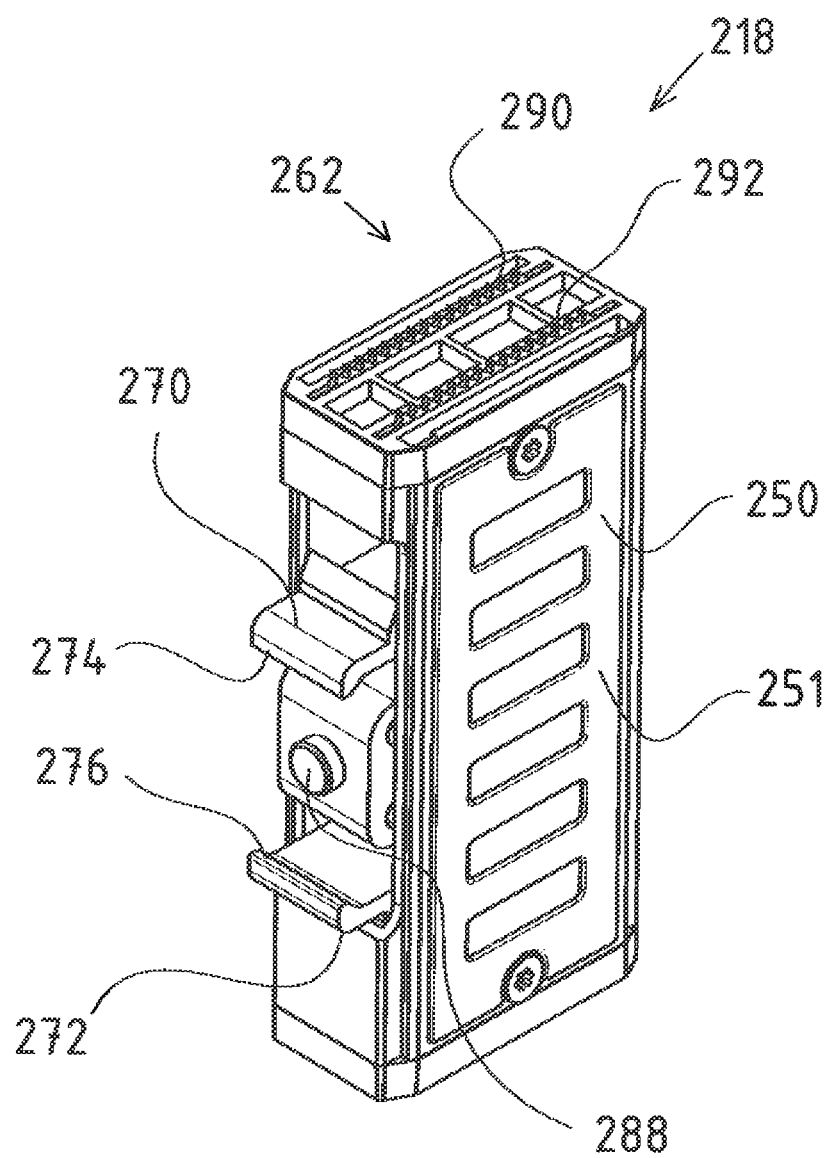
Figure 13:
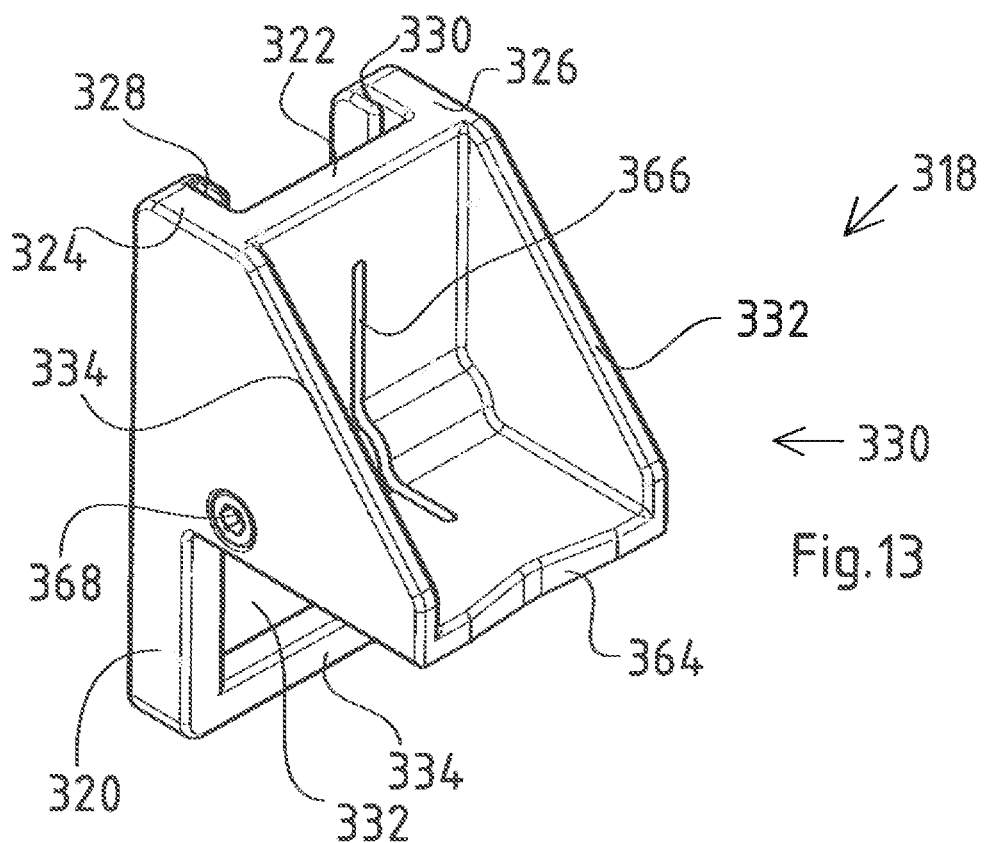
Figure 14:
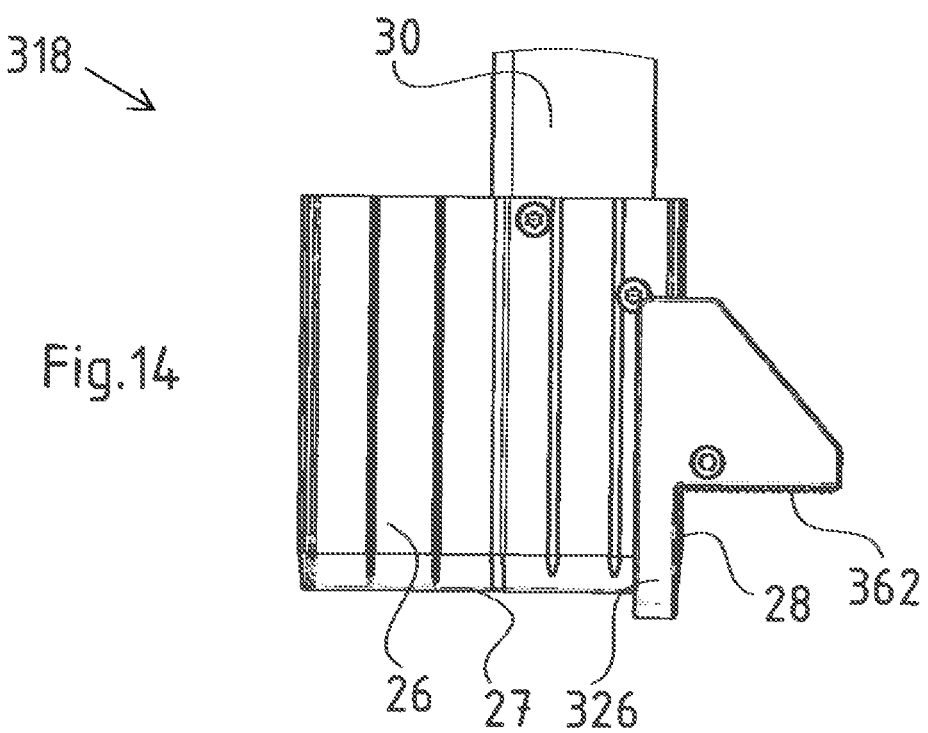
Figure 15:
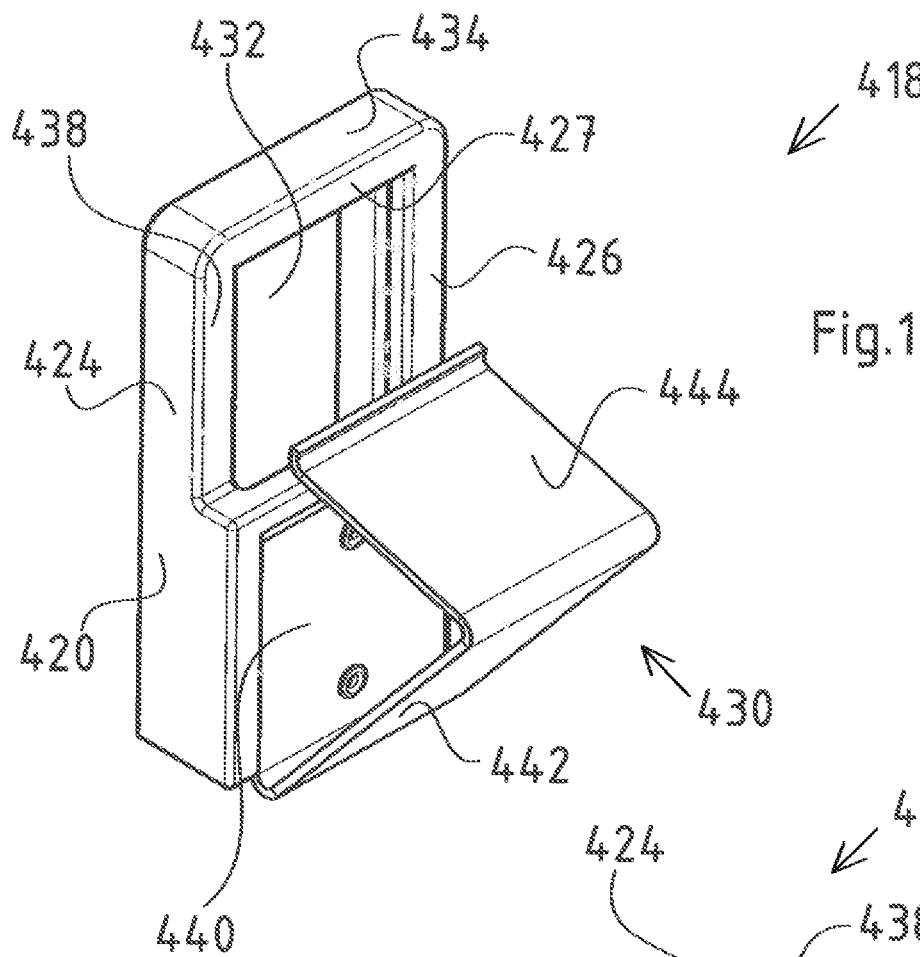
Figure 16:
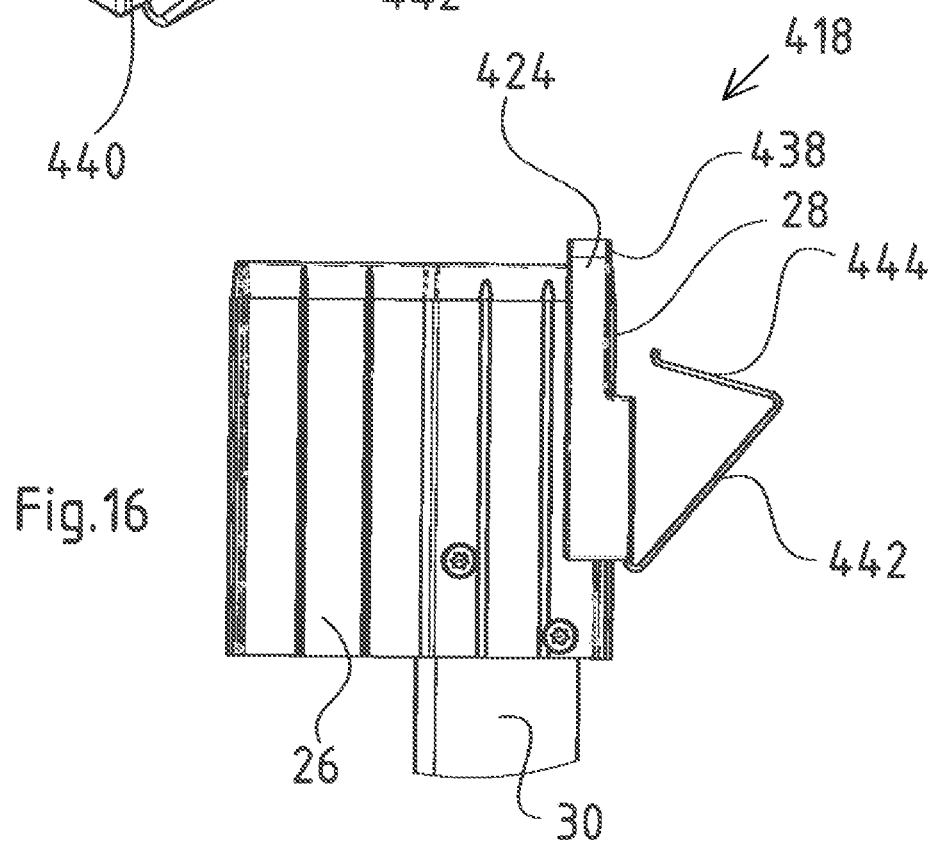
Figure 18:
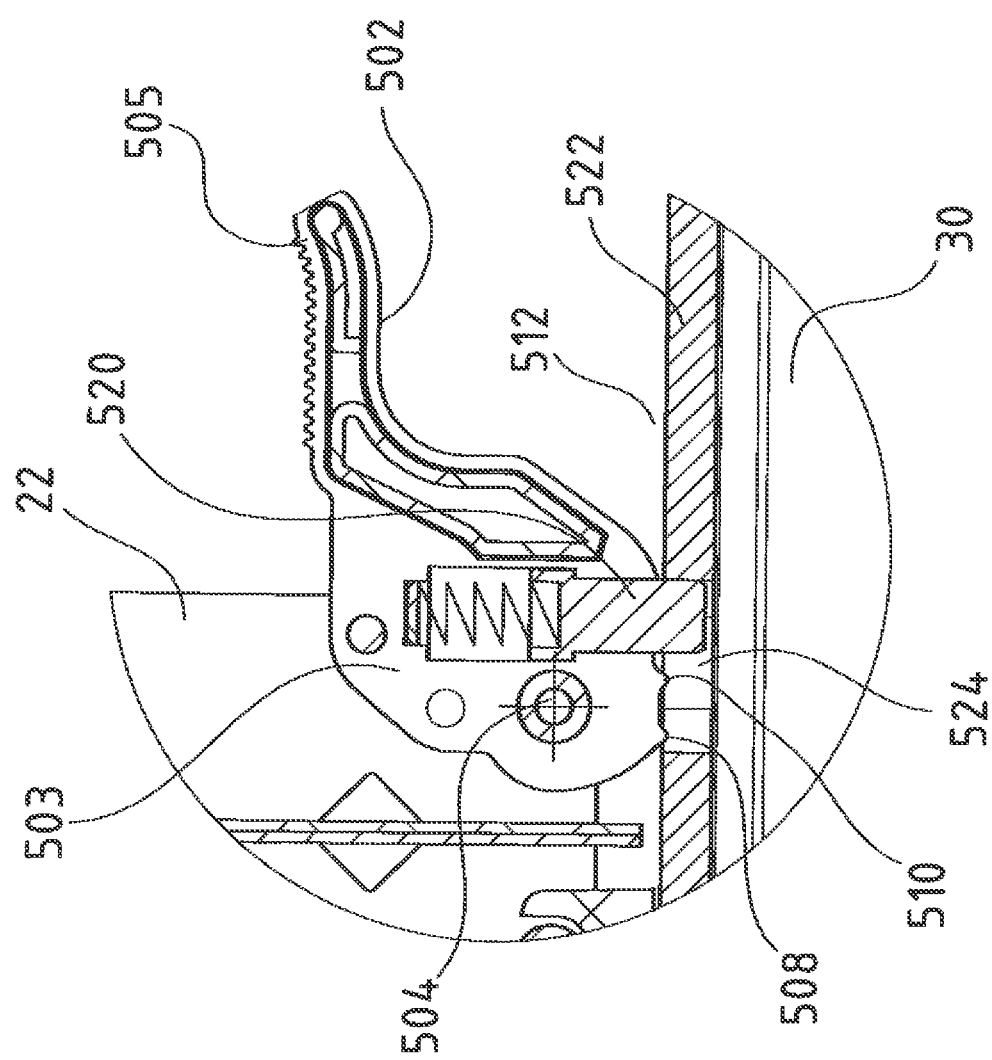
Figure 21:
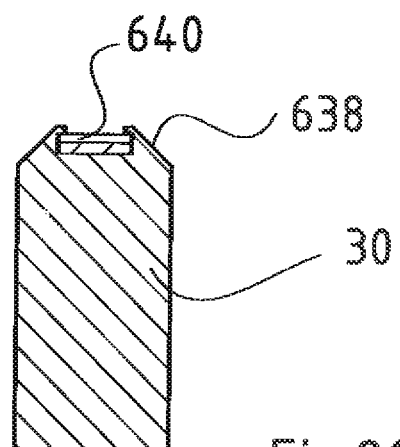
Figure 22:
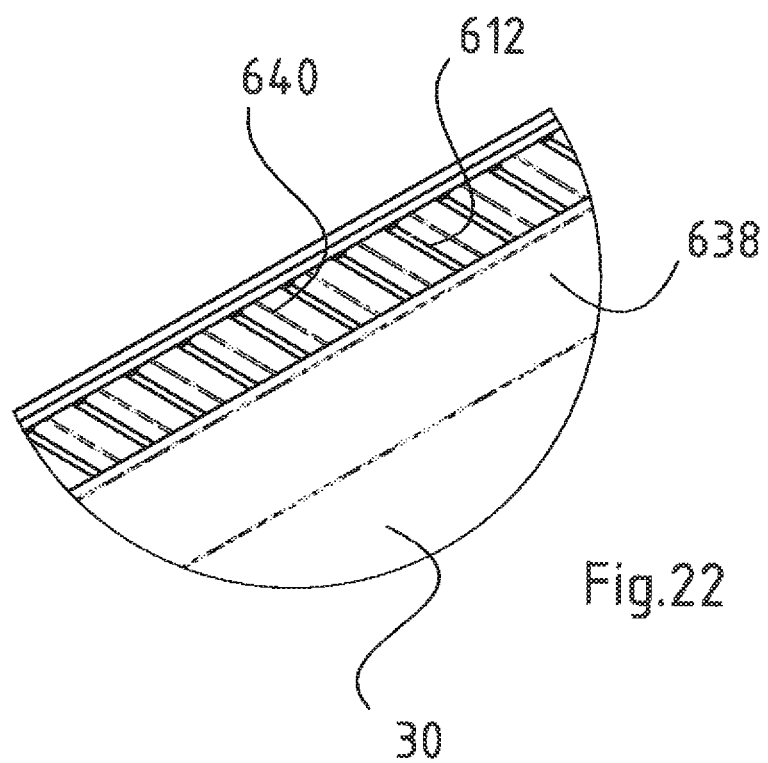

The drawing shows in:

FIG. 1 an extended spirit level,

FIG. 2 an end section of the spirit level according to FIG. 1,

FIG. 3 a detail of FIG. 2,

FIG. 4 a further end section of the spirit level according to FIG. 1,

FIG. 5 a detail of a first embodiment of a clamping device,

FIG. 6 a representation of the first embodiment of the clamping device,

FIG. 7 a section through the spirit level according to FIG. 1 with the clamping device according to FIGS. 5 and 6, FIG. 8 a second embodiment of a clamping device, FIG. 9 the clamping device according to FIG. 8 in section, FIG. 10 a third embodiment of a clamping device in a perspective view, FIG. 11 the clamping device according to FIG. 10 in section, FIG. 12 a side view of the clamping device according to FIGS. 10 and 11, FIG. 13 a fourth embodiment of a clamping device, FIG. 14 the clamping device according to FIG. 13 in side view and fastened to a spirit level section, FIG. 15 a fifth embodiment of a clamping device in a perspective view, FIG. 16 the clamping device according to FIG. 16 in a side view, FIG. 17 a, b an eccentric lever of a telescoping spirit level in various positions, FIG. 18 the eccentric lever according to FIG. 17 in a further position relative to the spirit level, FIG. 19a, b an engaging element in various positions, FIG. 20 a cutout section of a telescoping spirit level in the area of the engaging element, FIG. 21 a section through a profile element with toothing, FIG. 22 a detail of the toothing according to FIG. 21, FIG. 23 a detail of a telescoping spirit level with a sixth embodiment of a clamping device, FIG. 24 a detail of a telescoping spirit level with a seventh embodiment of a clamping device, FIG. 25 the clamping device according to FIG. 24 in section, FIG. 26 a cutout section of a telescoping spirit level, FIG. 27 the cutout section according to FIG. 26 with cladding omitted and FIG. 28 a sectional view through the cutout section according to FIG. 26.

FIG. 1 shows in an illustration of the principle a length-adjustable or telescoping spirit level 10, using which in the exemplary embodiment the vertical position of an object 12 is to be checked, which can for example be a stud wall or a scaffolding thereof. To do so, the spirit level 10 is fixed between areas 14, 16 in the bottom and top areas of the object 12, i.e. in the case of a stud wall or frame wall for example between sole or bottom plate and top plate or purlin, by means of clamping devices 18, 20 in accordance with the invention, of which at least one has a clamping element subjected to force, by means of which fixing in clamping manner of the spirit level 10 is enabled between the object areas such as sole or bottom plate and top plate or purlin 14 and 16. These clamping devices 18, 20 or those sections interacting with the object areas 14, 16 are aligned relative to the measuring plate of the spirit level 10 such that the measuring plate contacts the sections of the object areas 14, 16 which are to be used for checking the alignment of the object 12. After clamping of the spirit level 10 between the object areas 14, 16, for example in the horizontal position, the object 12 can then be set up without the spirit level 10 having to be held. After reaching a required position, i.e. a target angle, which does not have to be 90° to the horizontal but is preferably 90°, a signal is then generated by a sensor, such as an inclination sensor (not shown) installed in the spirit level 10.

The spirit level 10 has a general structure as shown in WO 02/101330 A1.

The telescoping, i.e. extendable spirit level 10 consists of a first body 22 with a section 24 of a measuring plate 24 and a second body 26 with a section 28 of the measuring plate.

Since the spirit level 10 in the exemplary embodiment is in the form of a hollow profile spirit level, a measuring surface section 25 is parallel to the section of the measuring plate 24 and a measuring surface section 29 is parallel to the section 28. The following however generally only takes account of the measuring plate. The statements in this connection apply however in equal measure for the measuring surface.

A profile element 30 that extends inside a chamber 32 extending in the longitudinal direction of the first body 22 originates from the second body 26. The chamber 32 is adapted in its internal geometry to the external geometry of the profile element 30 such that easy pushing in/pulling out of the profile element 30 from the longitudinal chamber 32 is possible in order to set the length of the spirit level 10 in this way. The spirit level 10 can thus have, for example in the non-extended state, a length of 120 cm to 200 cm and in the maximum extended state an effective overall length of for example 200 cm to 350 cm. These values are quoted purely as examples.

Regardless of the position of the second body 26 relative to the first body 22, it is ensured by the adaptation of the profile element 30 to the longitudinal chamber 32 in the first body 22, and preferably additionally on the basis of a force application described below to the profile element 30 in the direction of section 24 of the measuring plate, that the sections 24, 28 of the measuring plate are always flush with one another.

The first body 22 can furthermore have grip openings 34, 36 and vials 38, 40, 42, 44 for optical determination of the alignment of the spirit level 10 to the horizontal or vertical. Also, an electronic sensor is integrated in the spirit level 10, in particular in the first body 22, by which a signal is generated when the measuring plate of the spirit level 10 is aligned perpendicularly, i.e. vertically.

As can be seen in FIG. 1, the extent of the profile element 30 vertical to the measuring plate is less than that of the first body 22. The chamber 32 receiving the profile element 30 is therefore separated by a partition or by a tapering cross-section from the remaining interior of the first body 22 when the latter is designed overall as a hollow profile. There is of course also the possibility that a T-profile with an outer cross member being parallel to the section 24 of the measuring plate is connected to that area of the first body 22 limiting the chamber 32. A geometry may be selected, as can be found for example in WO 2019/168849 A1.

The second body 26 merges flush into the outer geometry of the first body 22 when the spirit level 10 is not extended.

FIG. 2 shows in an enlarged view the end section area 46 of the first body 22 with the clamping device 18, by means of which the spirit level 10 is clampable between the object areas 14, 16, i.e. between top plates or purlins, for example. A sectional view through the clamping device 18 is shown in FIG. 3.

Without departing from the invention, a corresponding clamping device 18, 20 may also be associated with the measuring surface sections 25, 29, since as already mentioned the features described in connection with the measuring plate also apply for the measuring surface.

In the following, however, one clamping device is associated with each of the measuring plate sections 24, 28 for the sake of simplicity, without this resulting in any restriction of the invention.

The clamping device 18 has a housing 48, to be referred to as base element, which for example is U-shaped in section. Inside the housing 48, a clamping element 50 producing the clamping effect is movable when subjected to force. To do so, spring elements 52, 54 are provided which are supported on the one hand on the interior of the housing 48 or on a section originating therefrom and on the other hand in the exemplary embodiment on an inner wall 56 of the clamping element.

The movement direction of the clamping element 50 is angled relative to the measuring plate, i.e. the section 24, as can be seen from the representation in FIG. 3. To do so, guide walls 58, 60 are provided in the interior of the housing 48, along which the clamping element 50 is movable in guided manner.

The clamping element 50 has on the outside a clamping section 64 providing a clamping surface 62 and supported on the object area 14, i.e. for example on a beam or top plate or purlin. As a result of the movement direction of the clamping element 50 being angled relative to the measuring plate—there is an acute angle α between the movement direction and the section 24 of the measuring plate—the spirit level 10 is pulled in the direction of the contact area 66 of the object area 14, ensuring that the measuring plate section 24 rests on or contacts the contact area 66 on the object area 14.

The angle α is preferably in the range between 10° and 15°.

The clamping device 18 is movable along the measuring plate section 24. To do so, the housing 48 can engage on the measuring plate side in a guided manner in a corresponding groove or web-like projection 68, which in those areas of the side walls 71, 73 of the first body 22 adjoining the measuring plate section 24 run in the longitudinal direction and parallel to the measuring plate.

To position the clamping device 18 in the required position, the side walls 71, 73 of the housing 48 are moved towards one another by means of, for example, a threaded bolt 72 such that the housing 48 is clamped tightly to the first body 22. In order not to impair the movement of the clamping element 50 by the threaded bolt 72 or an element having the same effect, a slot 74 is provided in the clamping element 50 in accordance with the representation in FIG. 3 and is parallel to the movement path of the clamping element 50, such that the latter can be passed through by the threaded bolt without the movement of the clamping element 50 being hindered. The travel of the clamping element 50 is also limited by the slot 74.

As shown in the drawing representation, the clamping device 18 runs relative to the front face cover 76 of the first body 22 such that the free end area of the measuring plate section 24 is freely accessible and hence can be brought into contact with/rested on the area whose alignment is to be checked in particular to the vertical.

FIG. 4 shows the second body 26 with the profile element 12 originating therefrom. From the second body 26 originates the further clamping device 20, which can have the same design as the clamping device 18, so that reference is made to the statements relating to the latter.

There is however also the possibility of designing the clamping device 20 such that it has no clamping element subjected to force, i.e. in particular movable by spring force. In this case, the clamping effect would be produced exclusively by the clamping device 18 having a corresponding clamping element 50 subjected to force.

The clamping device 20 too is connected to the second body 26 or positioned relative thereto such that the end area 82 of the measuring plate section 28 is uncovered and hence can be brought into contact with the object area 16.

FIG. 5 shows the clamping section 64 of the clamping element 50 in an enlarged view. The clamping surface 62 is clamped on by strips 84, 86 clamped in the clamping section 64 and in particular consisting of metal and having serrated projections, which strips can be placed in the section 64, for example in slot-like receptacles 88, 90 and fixed in a suitable manner. To that extent FIG. 5 is self-explanatory.

FIG. 6 shows once again the end area 46 of the first body 22 with the clamping device 18. A handling means 92 can be discerned, such as a knurled nut connected to the threaded bolt 72, by means of which the side walls 71, 73 of the housing 48 are pulled towards one another in order to be connected in clamping manner to the first body 22.

Since in the exemplary embodiment the edges of the side walls 71, 73 engage in longitudinal grooves 68 parallel to the measuring plate and inside the side walls 70 of the first body 22, said side walls 71, 73 have edges 94, 95 correspondingly angled towards one another and at a distance to which are webs 96, 97, such that longitudinal ribs projecting from the side wall can penetrate into the intermediate space. If webs are provided, as shown in FIG. 7, grooves are not required.

FIG. 7 shows a front view onto the first body 22 in the area of the clamping device 18. The front face cover 76 has been removed. The inward-angled edge sections 94, 95 on the edge side can be discerned, which grip behind the bead-like or web-like projections 68, 69 parallel to the measuring plate or its section 24 and limiting the side walls 70 of the first body. Projections 96, 97 originate from the inner faces of the side walls 71, 73 of the housing 48 at a distance and limiting the bead-like longitudinal projections 68, 69 on the measuring plate side. This assures a secure grip around the bead-like projections 68, 69.

FIG. 7 also shows that by means of the threaded bolt 72 and turning of the knurled nut 92 the side walls 71, 73 can be moved relative to one another in order to be fixed in clamping manner on the first body part 22 by gripping around the bead-like projections 68, 69.

In the representation in FIG. 7, it is discernible that the first body 22 receives the profile element 30 in the chamber 32 on the measuring plate side.

In the exemplary embodiment, the profile section of the first body 22 adjoining the chamber 32 has a lower width than said chamber 32, whereby the profile element 20 is guided between the transition between chamber 32 and upper chamber 33 of smaller cross-section and the inside of the bottom wall 35 of the chamber 32, which has the measuring plate section 24 on the outside.

FIGS. 8 and 9 show a further development of a clamping device 118 which has a housing 148, to be referred to as a base element, inside which device a clamping element 150 is subjected to a spring force, in order to fix in clamping manner a telescopic spirit level between object areas, in line with the teachings in accordance with the invention.

The clamping element 150 is passed through by threaded bolts 152, 154 in the movement direction of the clamping element 150, said bolts originating from the bottom 156 of the housing 148 and being surrounded by springs 158, 160 which are supported on the one hand on the bottom 156 of the housing 148 and on the other hand on the bottom face 165 of the clamping element 150 facing said bottom 156.

The heads 153, 155 of the threaded bolts 152, 154 act as stops and hence as a travel limiter for the clamping element 150.

At the front, the clamping device 150 has a clamping surface 162 formed by a sawtooth structure whose envelope 166 forms an acute angle to the measuring plate in the area facing said measuring plate, so that during clamping of the spirit level it is at the same time pulled to the object to be checked.

The clamping element 150 has a cuboid basic body 151 with clamping section 164 originating therefrom and projecting above the housing 148, which has the clamping surface 162 formed by a sawtooth-like structure in its free surface.

For fastening the clamping device 118, a fastening element 172, referred to as a shoe, originates from a side wall 170 and consists of a body 174 trapezoidal in section of which the side members 176, 178 form an acute angle to the side wall 170, thus creating undercuts.

In the area of the measuring plate, either in the measuring plate section 24 or the measuring plate section 28, a recess is provided such that the shoe 172 can be inserted into said recess in a position in which the longitudinal axis of the shoe 174 and accordingly the longitudinal axis of the housing 148 form an angle to the longitudinal axis of the spirit level of preferably 45° to 60°. The recess is designed such that the clamping device 118 can be rotated and aligned in the longitudinal direction of the spirit level. The shoe 174 is clamped tight at the same time.

To permit easy insertion into the receptacle, the latter has a projection intersecting the longitudinal central area of the measuring plate and penetrating into an appropriately adapted recess 180 in the shoe 174.

When the clamping device 118 is fixed, the required fixing, i.e. clamping of the spirit level, can be achieved by means of the clamping device 118, the movement direction of the clamping element 150 being parallel to the longitudinal axis of the spirit level and hence parallel to the measuring plate.

A further fastening possibility for a clamping device 218 is shown in FIGS. 10, 11 and 12.

Diverging from the exemplary embodiments of the type previously described, the clamping element 250 is designed as a housing inside which is arranged a base element, referred to as a base body 248, relative to which the clamping element 250 is movable, in accordance with the exemplary embodiment of FIGS. 1 to 7, at an angle β to the longitudinal axis of the spirit level when the clamping device 218 is connected thereto.

For movement of the clamping element 250, i.e. of the housing, relative to the base body 248, spring elements 258, 260 can be supported on the one hand on the base body 248 (wall 291) and on the other hand on a wall 264 of the clamping element 250, the outer surface of which is designed as a clamping surface 262 which in turn is formed by tooth-like projections. It is of course also possible to support spring elements between the lower walls shown in FIG. 11.

The movement direction of the clamping element 250 is determined by slots 266, 268 inclined relative to the longitudinal axis of the clamping element 250 or its housing and intersecting the measuring plate at an acute angle, in particular at an angle β where β is between 10° and 15°, when the clamping device 218 is fitted.

The travel of the clamping element 250 is achieved on the one hand by the limitation, at the top in the drawing, of the slots 266, 268 and on the other hand by walls of the base body 248 and of the clamping element 250, and as shown in the drawing representation by the wall 278 of the base body 248 and the wall 280 parallel thereto of the housing of the clamping element. The walls 278, 280 are vertical to the wall 270.

For fastening the clamping device 218, a fastening shoe is provided which is in a recess of the measuring plate and set back therefrom. This fastening shoe has a geometry in principle like that of the fastening shoe 174 according to FIGS. 8 and 9, so that reference is made here to the appropriate drawing representations.

To connect the clamping device 218 to the shoe and then to fix the clamping device 218, the base body 248 has web-like sections 270, 272 projecting above the housing 251 of the clamping element 250 with edge sections 274, 276 facing one another to grip behind the transverse edges 280, 282 (FIG. 9) of a shoe corresponding to the shoe 174. Prior to this, the clamping device 218 is aligned to the shoe such that the web-like sections 270, 272 run along the side surfaces 284, 286 (FIG. 8) of the shoe 174, in order to then rotate the clamping device 218 such that the angled edge sections 274, 276 grip behind the edges 280, 282.

In this position, the longitudinal axis of the housing 251 and hence of the clamping device 218 is aligned along the longitudinal axis of the measuring plate and of the spirit level.

To permit easy alignment of the clamping device 218 with the shoe, the base body has a centrally running projection 288 engaging in the recess 180.

As shown in the representation in FIG. 10, the clamping surface 262 is clamped by metal strips 290, 292 having a tooth structure, as set forth in connection with FIG. 5.

Further embodiments of clamping devices 318, 418 are shown in FIGS. 13 and 14 and in FIGS. 15 and 16 respectively.

The clamping device 318 in accordance with FIGS. 13 and 14 has, in divergence from the previous embodiments, no clamping element subjected to force, without departing from the teachings in accordance with the invention as a result; because clamping and hence fixing of the telescoping spirit level is also possible when a clamping element subjected to force and movable in particular by spring loading and hence acting in a clamping manner originates from only one of the bodies.

The clamping device 318 is slidable onto one of the front ends of the body, i.e. taking account of FIG. 1 either on the front face of the first body 22 or on that of the second body 26.

It is preferable that the clamping device 318 is slid onto the front area of the second body 26, as is made clear by FIG. 14.

The clamping device 318 has a base body 320 which in section has a C-shaped geometry with cross member 322 and side members 324, 326, which in turn have open longitudinal slots 328, 330 in the direction of the cross member 322 in order to receive correspondingly designed longitudinal webs of the second body 26 that run along the side walls of the measuring body.

As shown in the drawing representation, the base body 320 has a recess 332 limited by the side members 324, 326 and a member 334 connecting them. The height of the members 324, 326, 334 relative to the web-like sections (not shown) of the spirit level body placed into the slot-like recesses 328, 330 is matched to the measuring plate section 28 such that the surface of the measuring plate section 28 projects above the surface of the members 324, 326, 334, i.e. the measuring plate section is freely accessible and hence can be placed onto an object area.

The cross members 320, 326 are, as already mentioned, connected on the longitudinal side by the further member 334, with which the end face 27 of the body 26 can be brought into contact.

From the base body 320 originates a clamping body 330 which has side members 332, 334 which merge into the outer faces of the side members 324, 326 of the base body 320. Vertical to the side members 332, 334 is a wall 364 forming on the outside a clamping surface 362 and connected to the members 332, 334, said wall being in contact with an object area during clamping of the fixed spirit level. In accordance with the representation in FIG. 14, the clamping surface 362 has a structure which is formed in particular by sawtooth-like projections.

To ensure that the clamping device 318 is fixed when slid onto the body 26, the cross member 322 of the base body 320 and the wall 364 have a continuous slot-like recess 366 such that the side walls 332, 334 with the side members 324, 326 can be pulled towards one another when a threaded bolt 368 is tightened and hence connected in clamping manner to the second body 26.

The clamping device 418 according to FIGS. 15 and 16 has a base body 420 designed in accordance with FIGS. 13 and 14 with a recess 432, in which body the area of the measuring plate section—in the exemplary embodiment the end section of the measuring plate section 28—runs when the clamping device 418 is slid onto one of the bodies, in particular the second body 26, and projects above the edge 438 of the side members 424, 426 and of the member 434 connecting them on the measuring plate side.

A clamping body 430 originates from the base body 420 and in the exemplary embodiment is a curved flat element, in particular a sheet metal element, having an open and triangular geometry. A side member 440 is connected to the base body 420 and merges at an acute angle into a central member 442 which in turn merges into a further outer member 444, which can thus yield. The member 444 can accordingly be resting against an object area or be in contact therewith in order to enable or assist the clamping-type fixing of the spirit level.

A further development of the telescoping spirit level having independently inventive character is shown in FIGS. 17 to 22, which are basically self-explanatory.

FIGS. 17a, 17b, 18 show a cutout section of the extendable spirit level. In this section, the profile element 30 and the first body 22 are shown in its open end area, which then merges flush into the second body 26 when the spirit level 10 is not extended.

In the area of the opening 500, an eccentric lever 502 is swivelably connected to the first body 22, in order to permit, depending on its position, either a movability of the profile element 30 and hence of the second body 26 relative to the first body 22 (FIG. 17b) or fixing or engagement relative to one another (FIG. 18). The latter permits that the bodies 22, 24 are, before clamping of the spirit level, initially at a distance and fixed relative to one another to an extent that the clamping devices 18, 20 are aligned with the object areas such that by movement of one of the clamping devices, for example the clamping device 18, the spirit level can then be clamped to the required extent between the object areas and hence fixed.

The eccentric lever 502 has a body passed through by a shaft 504 and a handling means 505, by means of which the eccentric lever 502 is swiveled.

In the position shown in FIGS. 17a and 18, the swivel lever 502 effects either a positive engagement (FIG. 18) or a non-positive fixing (FIG. 17a) of the bodies 22, 26 relative to one another. To do so, the eccentric lever 502, i.e. the body 503, has a flat side 506 with projections 508, 510, which in the swiveled position (closing position) of the eccentric lever 520, in which movement of the profile element 30 is to be at least inhibited, is in contact with the surface 512 of the profile element 30 on the swivel lever side. In the body of the swivel lever, a recess such as a free space 514 is provided in the area of the projections 508, 510 between the latter and the shaft 504, resulting in a web-like section 516 from which the projections 508, 510 originate. Due to the free space 514, the web 516 is to a certain extent elastically yielding, with the consequence that even with the production tolerances of the profile element 30 reaching the eccentric end position and hence contact of the projections 508, 510 with the surface 512 is achieved and hence at least non-positive fixing of the profile element 30 relative to the first body 22 is possible.

If the eccentric lever in the drawing representation is swiveled counter-clockwise (as shown in FIG. 17b), the projections are moved away from the surface 512 of the profile element 30, permitting an uninhibited movement of the profile element.

An engaging pin 520 preloaded by a spring 518 or an element having the same effect is movably arranged in the body 503 of the eccentric element 502 and its movement direction is, when the projection 508, 510 is supported on the surface 512, vertical or substantially vertical to said surface 512, i.e. is in its normal direction. In accordance with the invention, recesses 524 are provided in the wall 522 of the profile element 30 having the surface 512, and said profile element can be designed as a hollow profile, into which recesses the engaging pin 520 can penetrate, preventing any further movement of the profile element 30 relative to the first body 22, i.e. the bodies 22, 26 remain in an engaged position relative to one another.

The engaging recesses 524 are designed as slots in the longitudinal direction of the profile element 30 in order to permit swiveling of the eccentric lever 502.

With the eccentric lever 502, the profile element 30 is furthermore subjected to force in the direction of the bottom wall of the chamber 32 of the first body 22, along which is the measuring plate or the measuring plate section 24. As a result, it is additionally ensured that the second body 26 runs relative to the first body 22 when the spirit level 10 is extended such that the measuring plate sections 24, 28 are flush with one another.

FIGS. 19a, 19b and 20 show a further possibility for engaging movement of the bodies 22, 26.

A toothed structure is provided in the upper face 612 of the profile element 30, either by machining of the surface or by insertion of a toothed belt (FIGS. 21, 22). The toothed structure interacts with an engaging element 614 which can be actuated from the upper face 616 of the first body 22, that is parallel to the measuring plate using a handling means such as a button 618.

The engaging element 614 has a bottom section such as a wall 620 with projections 622, 624 designed to match the toothing 612 in order to engage positively therein, as is made clear by FIG. 20.

The engaging element 614 has two members 630, 632 swivelable about axes 626, 628. The axes 626, 628 are determined by pin-like elements which in turn originate from the side walls 35, 37 of the first body 22, specifically from those sections limiting the upper chamber 33.

The members 630, 632 are connected to the bottom section 620 via web-like walls 634, 636. If the button 618 is moved, i.e. pressed into the interior of the body 22, the members 626, 628 swivel, with the result that the bottom wall 620 is moved in the direction of the upper face 614 of the first body 22, such that the projections 622, 624 are disengaged from the toothing 612 and hence movement of the profile element 30 is enabled (FIG. 19b).

As shown by the representations in FIGS. 21 and 22, the profile element 30 has a top area 638 designed roof-like and distally from the measuring plate, with a groove into which a toothed belt 640 with toothing 612 is inserted. Alternatively, corresponding toothing could also be provided in the surface of the profile element 30. If the profile element 30 is a profile of metal, the toothing can be made for example by milling.

FIGS. 23 to 25 show further features characterizing the invention and having independently inventive content.

FIG. 23 shows a section of the first body 22 with the measuring plate section 24. A clamping device 718 is fastened in the end area. To do so, the clamping device 718 can initially be moved along the measuring plate section 24 into the required position and then clamped tightly.

There is however also the possibility to connect the clamping device 718 to the first body 22 only in a single position, corresponding to the fixing of the fixing element 720 to the second body 26, as shown in FIGS. 24 and 25. In this case, the spirit level is initially extended to an extent that the clamping device 718, 720 is aligned in terms of distance to the distance of the object areas between which the spirit level is to be clamped.

This is enabled by the engagement in accordance with the invention. In order to position the clamping device 718, 720 between the object areas regardless of that, it is provided that the clamping element 764 of the clamping device 718 is moved against the spring element acting on it, i.e. in the exemplary embodiment it is moved away from the end area of the first body 22.

To enable to that extent an easy movement, a lever such as a pedal lever element 722 is provided which is swivelable about a shaft passing through the clamping device 718, i.e. its base body, and is connected to the clamping element 764 such that during swiveling of the lever 722 in the direction of the end area of the first body 22 the clamping element 764 is lifted to the required extent and hence the spirit level is positioned between the object areas and, after release of the lever 722, clamped between them and hence fixed.

FIGS. 24, 25 show the clamping device 720, which does not itself have a clamping element, but forms a practically rigid clamping device 720, without clamping of the spirit level being ruled out, since it is as already mentioned sufficient when one of the clamping devices has a clamping element subjected to force, in particular spring-loaded, as is applicable for the clamping device 718.

FIGS. 24, 25 show a cutout section of the second body 26 and of the measuring plate section 28 at a distance from the free end of said measuring plate section 28, which runs in the front area of the second body 26, is visible in the drawing representation in FIG. 24 and extends in the direction of the upper edge of the drawing.

For fastening the clamping device 720 to the second body 26, a recess is provided in the measuring plate section 28 into which a kind of key element 730 engages which originates from the clamping device 720 in order to fix said clamping device 720 using said element. The key head 732 and the associated opening 734 in the measuring plate 28 have a geometry such that in a first position of the key head 732 it can be placed into the opening 734 and the clamping device 720 is fixed after turning of the key head 732, i.e. the key head can no longer be pulled out of the opening 734.

Further independently inventive proposals of a/the telescoping spirit level 10 can be seen in FIGS. 26 to 28. FIGS. 26 to 28 set forth devices of extendable spirit levels by which on the one hand pulling of the profile element 30 out of the first body 22 is inhibited and on the other hand there is the possibility that pulling apart of the spirit level parts, i.e. putting the first body at a distance to the second body 22, 26 is performed in small steps in a practically timed manner, enabling a precise matching of the length to the distance between object areas between which the spirit level is to be fixed. The corresponding solution proposals are independently inventive.

For example a first lever element 800 is swivelably arranged in a housing 802 which is connected to the open front area of the first body 22 or originates therefrom, as shown in the representation according to FIG. 26. In the drawing representation, the spirit level is shown in cutout section in the non-extended state, in which the second body 26 is in contact with the housing 802.

The lever 800 extends inside the upper chamber 33 of the spirit level body or of the first body 22 designed as a hollow profile in the exemplary embodiment and comprises with members 804 the side walls of the profile element 30. The corresponding sections extending along the side walls are connected to one another by a cross member 806 which, depending on the position of the lever 800, contacts the underside 808 of the profile element 30 or is at a distance thereto. In the case of contact, inhibition of the movement is achieved during pulling of the profile element 30 out of the first body, i.e. the chamber 32. If the lever 800 is swiveled (in FIG. 26 to the right), a distance is created to the underside 808, in order to allow movement of the profile element 30 without inhibition, i.e. to allow it to be pulled out of the first body 22 in the pull-out direction (arrow 810).

A spring element 811 acts on the lever 800 so that it remains in the inhibition position. The lever 800 must accordingly be swiveled against the spring to the left in FIGS. 27, 28 and to the right in FIG. 26 so that the inhibition position is lifted.

Furthermore, a so-called transport lever 812 is mounted in the housing 802 and interacts with a transport element 814 that surrounds the profile element 30 on the circumferential side, i.e. has members 816 along the side walls of the profile element 30, consisting of a first cross member 816 along the bottom 808 and a second cross member 818 contacting the upper face 822 of the profile element 30 depending on the position of the transport lever 812. The transport element 814 is connected to a spring element 820 by which said transport element 814 tries to make contact with a stop 824 in order to create a distance therefrom when the transport lever 812 is swiveled.

The transport element 814 has an annular geometry in rectangular form.

The distance between the cross members 816 and 818 is such that when the transport lever 812 is swiveled to the right in FIGS. 27, 28 and to the left in FIG. 24, the cross member 818 of the transport element 814 contacts the upper face or surface 822 of the profile element 30 and moves it by frictional locking in the direction of the arrow 810. This enables fine setting of the effective length of the telescopic spirit level 10.

The housing 802 is firmly connected to the first body 22. The lower cross member 816 is fixed in position inside a recess, such as a groove, in the housing 802, which is limited by the underside of the profile body 22, as made clear by FIG. 28. The lower cross member 816 forms the shaft about which the transport element 814 is swivelable.

The underside of the housing 802 merges into the measuring plate. The top of the housing 802 should also merge flush into the measuring surface. To that extent, FIGS. 26 to 28 are self-explanatory.

The housing 802 is practically a section of the first body 22.

The transport lever 812 can if necessary be locked in the position in which the transport element 814 fixes the profile element 30 by frictional locking, so that shortening the length of the spirit level 10 is not possible. This can be achieved alternatively or additionally by the unlocking lever 800.

The transport lever 812 and the transport element 814 have the same effect functionally as a quick-action screw clamp to set the bodies 22, 24 at a distance and fix them, and hence where necessary clamp the spirit level between two object area.

By means of movement of the bodies 22, 26 relative to one another, i.e. forcing them apart, by moving the transport lever 812 back and forth, the spirit level can be clamped between object areas without a clamping element subjected to force being needed. In this case, the spirit level should have two stops projecting above the measuring plate or measuring surface, which can correspond to a design such as that of the clamping devices 318, 420. Clamping between object areas by contact of the front areas of the first and second bodies 22, 26 would also be possible.

What is claimed is:

1. A spirit level for checking the alignment of an object, comprising a first elongated body and a second body movable therealong and connected thereto, and a fixing device, by means of which, the first and the second body are fixable relative to one another, said first and the second body each having at least one section of at least one measuring plate and/or a measuring surface of the spirit level, wherein the spirit level has a clamping element of a clamping device subjected to force in the longitudinal direction of said spirit level, and/or a transport element forcing the first and second body apart by frictional locking, and also fixing them relative to one another in order to fix the spirit level between object areas.

2. The spirit level according to claim 1,
wherein
the clamping device projects above the measuring plate, or measuring surface of the spirit level.

3. The spirit level according to claim 1,
wherein
the clamping device has a contact surface transverse to the longitudinal direction of the spirit level for making contact with an object area.

4. The spirit level according to claim 3,
wherein
the contact surface is in a first end area of the measuring plate, or measuring surface, that the plane or envelope formed by the contact surface intersects the measuring plate, or measuring surface at an acute angle, and that the contact surface is at a distance from the first end area.

5. The spirit level according to claim 1,
wherein
the clamping device acting due to an applied force is arranged as the first clamping device in the first end area and a second clamping element, or supporting element subjected to force is arranged in the opposite second end area.

6. The spirit level according to claim 1,
wherein
the first body is, in some sections, steplessly movable relative to the second body and is engageable in at least one position, in which the first body is moved longitudinally relative to the second body.

7. The spirit level according to claim 1,
wherein
the first body is movable relative to the second body and engaged in position.

8. The spirit level according to claim 7,
wherein
an engagement structure originates from one of the bodies, or from an element connected thereto, and running in its longitudinal direction, at least in some sections, or is designed in or on the body, in which structure engages an engaging element originating from the other body, and preloaded in the direction of said engagement structure.

9. The spirit level according to claim 7,
wherein
at least one recess is provided in the one body or element and the other body has an element preloaded in the direction of the recess and engaging in said recess when it is aligned flush therewith.

10. The spirit level according to claim 1,
wherein,
via a transport element, the second body is length-adjustable relative to the first body by frictional locking, the transport element is a swivel element mounted in the first body, or in a device connected thereto, and extending along side walls, bottom wall, and top wall of a profile element originating from the second body, and guided in said first body.

11. The spirit level according to claim 1,
wherein
an unlocking lever originates from the first body, which, in its basic position, permits an increase of the distance between the bodies, and prevents a decrease in the distance.

12. The spirit level according to claim 1,
wherein
the clamping device has a base element connected to one of the bodies, and the clamping element having the contact surface and movable in the longitudinal direction of the spirit level by at least one spring element in the direction of the first end area.

13. The spirit level according to claim 12,
wherein
the base element extends along the measuring plate, or measuring surface, and is connected to one of the bodies by passing through, engaging in, or enclosing said measuring plate, or measuring surface.

14. The spirit level according to claim 12,
wherein
the base element is designed movable along the body, and is connected to the body via a dovetail connection extending along the measuring plate, or measuring surface.

15. The spirit level according to claim 1,
wherein
the base element has, or is, a housing surrounding the clamping element, at least in some sections.

16. The spirit level according to claim 3,
wherein
the contact, or clamping surface has a convex course with section on the measuring plate side, that forms an acute angle β with the measuring plate, or measuring surface, or with a straight line parallel thereto.

17. The spirit level according to claim 3,
wherein
the contact, or clamping surface has, in the section which runs vertical to the measuring plate, or measuring surface, and in its longitudinal direction, a wave-like, or sawtooth-like structure.

18. The spirit level according to claim 1,
wherein
the clamping element is subjected to force along a straight line which intersects the measuring plate, or measuring surface, at an acute angle α when the clamping device is connected to the spirit level, and the clamping surface is preferably vertical to the straight line.

19. The spirit level according to claim 18,
wherein
the angle α is $5°≤α≤15°$.

20. The spirit level according to claim 1,
wherein
the first body has a first profile element in the longitudinal direction of the body, and in the form of a first hollow profile, the second body has a second profile element, movably arranged inside the first hollow profile, the fixing device is an eccentric lever originating from the first body with an engaging element subjected to force in the direction of the second profile element for engagement in an engaging recess provided in the second profile element.

21. The spirit level according to claim 20,
wherein
the eccentric lever is designed such that, in a first position, a movability of the second profile element inside the first profile element is enabled, and that, in a second position, the engaging element is aligned vertically, or almost vertically, to the longitudinal axis of the second profile element.

22. The spirit level according to claim 20,
wherein
the eccentric lever has a limiting surface having at least one projection which is the outer surface of an elastically yielding web-like section of the eccentric lever which, in the second position of said eccentric lever, is supported on the outer surface, facing away from the measuring plate, of the second profile element with the at least one projection to inhibit movement of the bodies, and/or to prevent movement by frictional locking.

23. The spirit level according to claim 1,
wherein
the measuring plate section, or measuring surface section of the first and/or second body, is limited by side wall sections of the first and/or second body, or is adjacent thereto, and groove-like depressions and/or strip-like projections in the side wall sections parallel to the measuring plate section, or measuring surface section.

24. The spirit level according to claim 23,
wherein
the depressions and/or projections interact with sections of the base element of the clamping device to move them along the measuring plate section/measuring surface section, and, for fixing of the clamping device, sections thereof can be in clamping contact with the side wall sections.

25. The spirit level according to claim 1,
wherein
a base element of the clamping device has a receptacle for the end area of the first or second body on the measuring plate side.

26. The spirit level according to claim 25,
wherein
the receptacle has a recess extending along the end area on the measuring plate side, and projecting above the measuring plate, or measuring surface.

27. The spirit level according to claim 25,
wherein
a section designed integral with the base element projects as the clamping element from said base element, and has, in a first section parallel to the recess, a U-shaped geometry, with the member facing the recess being, or having, the clamping surface.

28. The spirit level according to claim 1,
wherein
an open and polygonal-column, and resilient flat element, originate from a base element of the clamping device, a first outer member being connected to said base element, and merging into a central member which, in turn, merges into a further outer member having the clamping surface.

29. The spirit level according to claim 25,
wherein
a fixing element projects from the base element, and is associated with a receptacle passing through the measuring plate section, or measuring surface section of the first and/or the second body, and wherein the fixing element is insertable in a first position into the receptacle, and the base element is fixed after rotation of the fixing element and alignment of the base element along the measuring plate, or measuring surface in the receptacle.

30. The spirit level according to claim 1,
wherein
the first and/or second body has a fixing element associated with a recess of the measuring plate, or measuring surface section, and set back from said measuring plate, or measuring surface, said fixing element being associated with a receptacle originating from the base element which, in a first position of said base element, can be placed onto the fixing element, and after rotation of the base element and alignment thereof in the longitudinal direction of the measuring plate, or measuring surface is fixed on the fixing element.

31. The spirit level according to claim 1,
wherein
the spirit level contains a sensor which generates a signal at a predetermined target angle of the spirit level.

32. The spirit level according to claim 1,
wherein
the clamping element is connected to a lever element, by means of which, the clamping element is movable against the force applied.

33. The spirit level according to claim 32,
wherein
the lever element is a pedal lever swivelable about a shaft passing through the clamping device.

34. The spirit level according to claim 10,
wherein
the transport element is movable by means of the transport lever in the pull-out direction of the spirit level, where, during movement of said transport element, it interacts in frictional locking with the profile element originating from the second body and guided inside the first body.

35. The spirit level according to claim 10,
wherein
the transport element has members along the side walls of the profile element consisting of a first cross member along the bottom of said profile element, and a second cross member supported on the upper face of said profile element, or at a distance thereto, depending on the position of the transport lever, said first cross member being fixed in position.

36. The spirit level according to claim 10,
wherein
the transport element can be subjected to force by a spring element in the direction of a stop, the second cross member of said transport element being at a distance from the upper face of the profile element when in contact with said stop.

37. A method for setting up of an object wherein the alignment of the object on a target angle is checked by means of the spirit level according to claim 1, wherein, in one end area of the spirit level, the clamping element is subjected to force, and acting in the longitudinal axis direction of the spirit level, and, in the other end area, a further clamping element is subjected to force, and acting in the longitudinal axis direction of the spirit level, or a supporting element are provided, comprising the method steps:
clamping of the spirit level between the object areas when the object is aligned outside the vertical,
setting up of the object, a signal being generated by a sensor integrated in the spirit level upon the target angle being reached, and
fixing of the object in its target angle position.

38. The method according to claim 37,
wherein
the spirit level is clamped tightly in the horizontal, or substantially horizontal position, of the object between the object areas.

39. The method according to claim 37,
wherein
the bodies of the spirit level movable relative to one another are fixed relative to one another by engagement, taking into account the predetermined distance between the object areas, and the spirit level is then positioned in clamping manner between the object areas.

40. The method according to claim 37,
wherein
the clamping element subjected to force is at a distance from the associated end area of the first body such that the measuring plate, or measuring surface of the spirit level, contacts the object area between the clamping element and the end area of the spirit level on the clamping element side.

41. The method according to claim 37,
wherein
the further clamping element subjected to a force, or the supporting element, is at a distance to the associated end area of the second body such that the measuring plate, or measuring surface of the spirit level, contacts the object area between the further clamping element, or supporting element, and the end area.

42. The method according to claim 37,
wherein
the signal is generated when the object is aligned in its vertical position.

43. The spirit level according to claim 1, wherein the clamping device originates from the measuring plate, or measuring surface, or from the area adjacent thereto of the first and/or second body.

* * * * *